United States Patent
Corghi

(10) Patent No.: US 11,897,297 B2
(45) Date of Patent: *Feb. 13, 2024

(54) TYRE CHANGING MACHINE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 321 days.

This patent is subject to a terminal disclaimer.

(21) Appl. No.: 17/132,933

(22) Filed: Dec. 23, 2020

(65) Prior Publication Data

US 2021/0114420 A1  Apr. 22, 2021

Related U.S. Application Data

(63) Continuation of application No. 15/730,258, filed on Oct. 11, 2017, now Pat. No. 10,906,365.

(51) Int. Cl.
*B60C 25/138* (2006.01)
*B60C 25/05* (2006.01)

(52) U.S. Cl.
CPC .......... *B60C 25/138* (2013.01); *B60C 25/059* (2013.01); *B60C 25/0512* (2013.01);
(Continued)

(58) Field of Classification Search
CPC . B60C 25/04; B60C 25/0506; B60C 25/0512; B60C 25/0545; B60C 25/0578;
(Continued)

(56) References Cited

U.S. PATENT DOCUMENTS 6,629,554 B2  10/2003  Mimura
7,128,119 B2  10/2006  Corghi
(Continued)

FOREIGN PATENT DOCUMENTS

CN  101492001 A  7/2009
EP    1177920 A2  2/2002
(Continued)

OTHER PUBLICATIONS

AN2002A000041 dated Sep. 3, 2002, Petrolati Liviano.
(Continued)

*Primary Examiner* — David B. Thomas
(74) *Attorney, Agent, or Firm* — The Dobrusin Law Firm, P.C.

(57) ABSTRACT

A tyre changing machine (1), configured to remove a tyre from a respective rim of a vehicle wheel (2), comprises an operating arm (4) which includes: a supporting structure (401); a head (5) movable along a longitudinal axis (402) relative to the supporting structure (401); a removal tool (403) pivoted to the head (5) to rotate relative thereto about an axis of oscillation (405') transverse to the longitudinal axis (402); a driving member (6) movable along an operating axis (402') parallel to the longitudinal axis (402) relative to the supporting structure (401) and to the head (5), and articulated to the removal tool (403) at an operating point (P) which is spaced from the axis of oscillation (405'); an actuator (407) comprising a stationary member (407a), connected to the supporting structure (401), and a movable member (407b), adapted to drive the removal tool (403) in rotation and in translation; a coupling member (7) coupled to the supporting structure (401), to the head (5) and to the driving member (6). The movable member (407b) of the actuator (407) is connected to the driving member (6) to directly drive it along the operating axis (402').

20 Claims, 7 Drawing Sheets

(52) U.S. Cl.
CPC ...... *B60C 25/0545* (2013.01); *B60C 25/0593* (2013.01); *B60C 25/0584* (2013.01)

(58) Field of Classification Search
CPC .............. B60C 25/0584; B60C 25/059; B60C 25/0593; B60C 25/132; B60C 25/138
See application file for complete search history.

(56) References Cited

U.S. PATENT DOCUMENTS

| | | | |
|---|---|---|---|
| 7,395,849 | B2 | 7/2008 | Corghi |
| 7,455,096 | B2* | 11/2008 | Bonacini ............ B60C 25/0578 157/1.24 |
| 7,500,504 | B2 | 3/2009 | Bonacini |
| 8,807,976 | B1 | 8/2014 | Delgado |
| 8,973,640 | B1 | 3/2015 | Hanneken |
| 10,906,365 | B2* | 2/2021 | Corghi ................ B60C 25/0593 |
| 11,110,761 | B2* | 9/2021 | Corghi ................ B60C 25/0545 |
| 2004/0221964 | A1 | 11/2004 | Bonacini |
| 2008/0179014 | A1* | 7/2008 | Sotgiu .................. B60C 25/138 157/1.3 |
| 2010/0089538 | A1 | 4/2010 | Bonacini |
| 2012/0291961 | A1 | 11/2012 | Bonacini |
| 2013/0139973 | A1 | 6/2013 | Bonacini |
| 2016/0075194 | A1 | 3/2016 | Bonacini |

FOREIGN PATENT DOCUMENTS

| | | |
|---|---|---|
| EP | 1479539 A2 | 11/2004 |
| EP | 1398184 B1 | 10/2007 |
| EP | 1916125 B1 | 7/2009 |
| EP | 1177920 B3 | 6/2010 |
| EP | 2949486 A1 | 12/2015 |
| EP | 2962876 A1 | 1/2016 |
| WO | 2009/138322 A1 | 11/2009 |

OTHER PUBLICATIONS

BI2013A000008 dated May 21, 2013, Biella Produces.
Search Report for Application No. IT201600104639, dated Jun. 21, 2017.
Search Report for Application No. IT201600104507, dated Jun. 20, 2017.

* cited by examiner

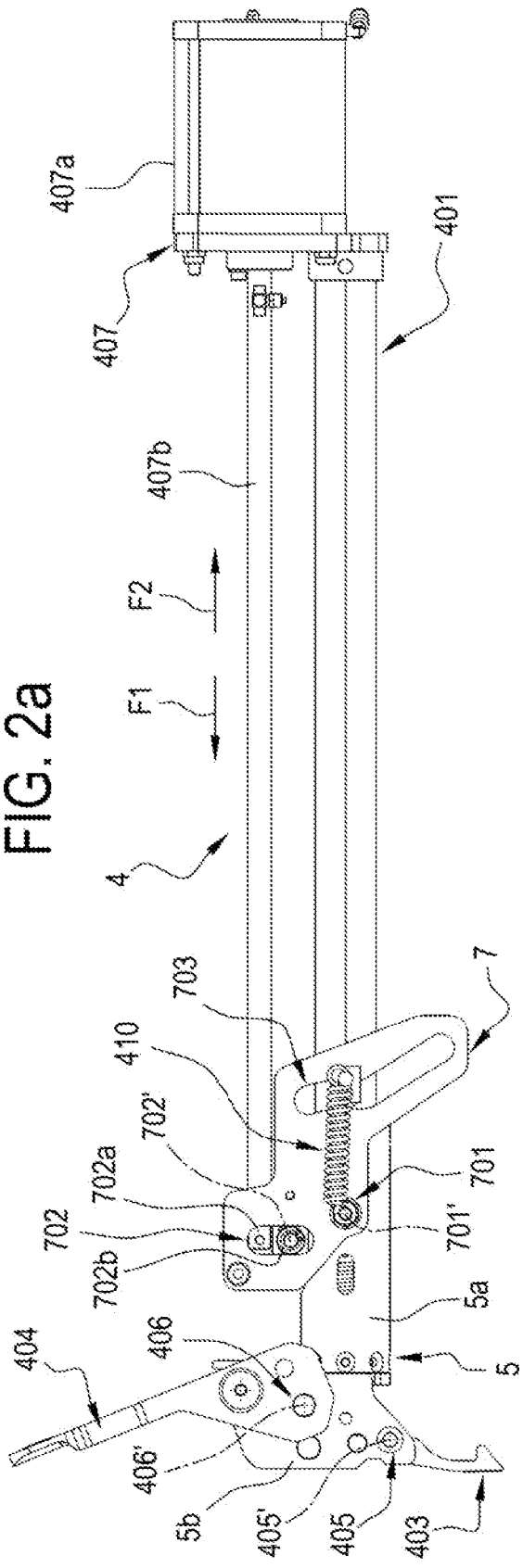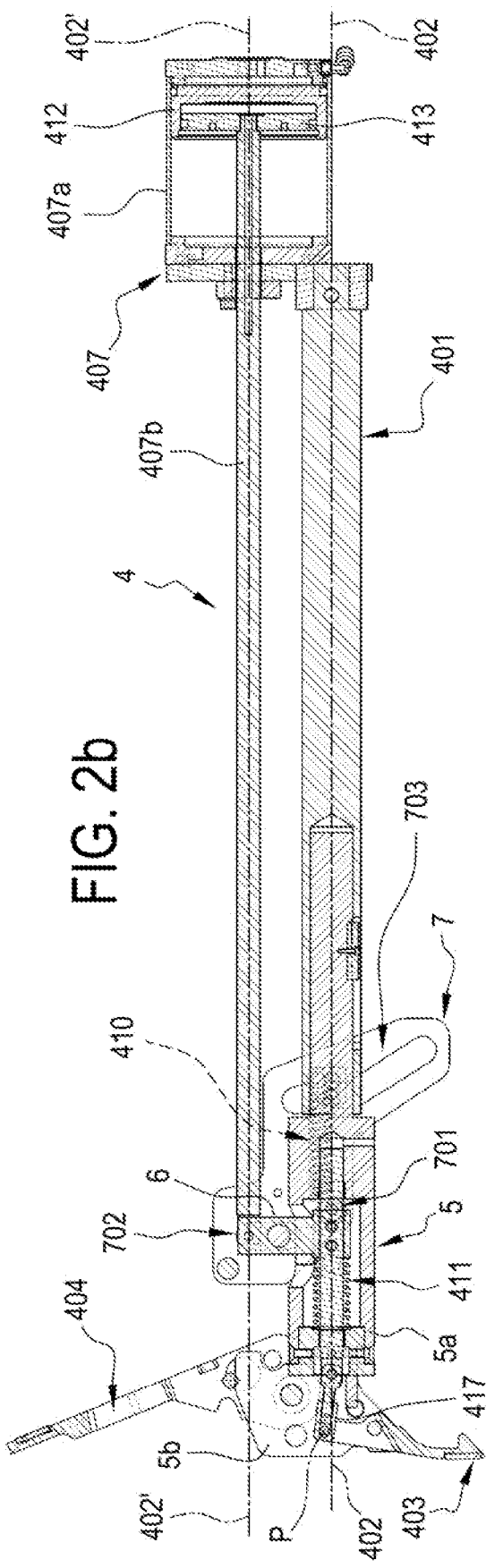

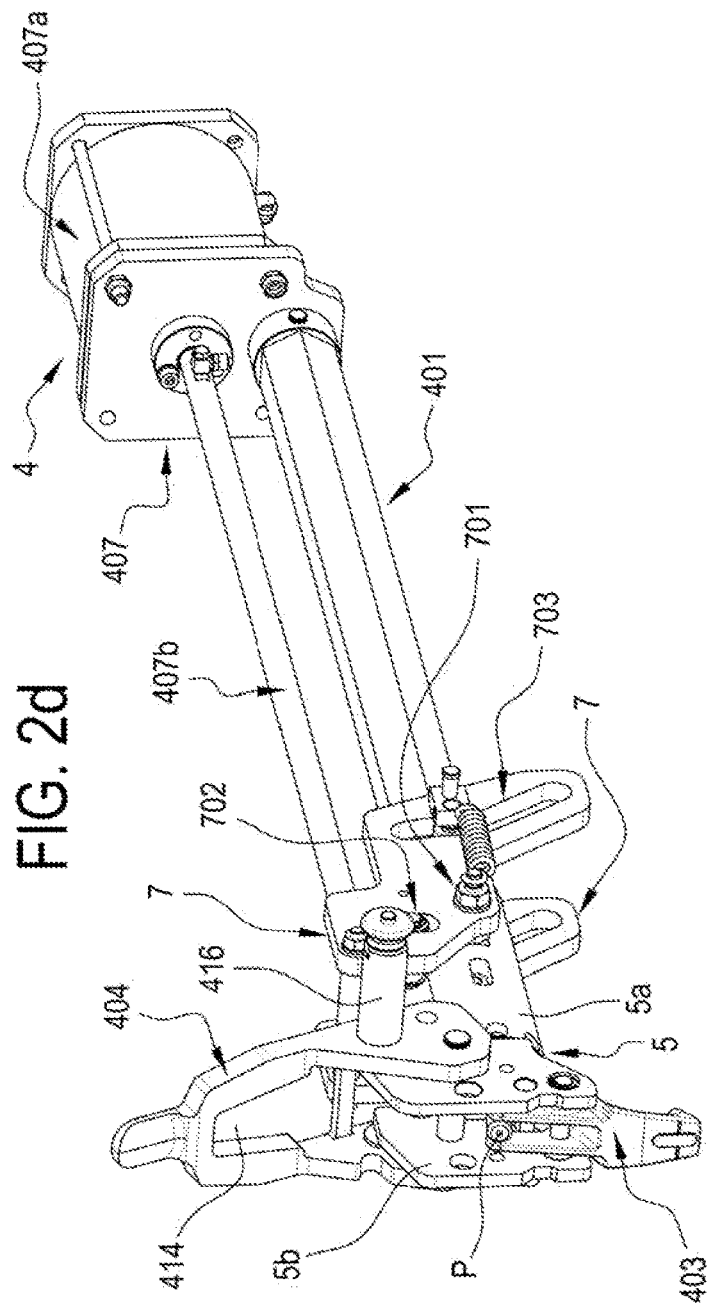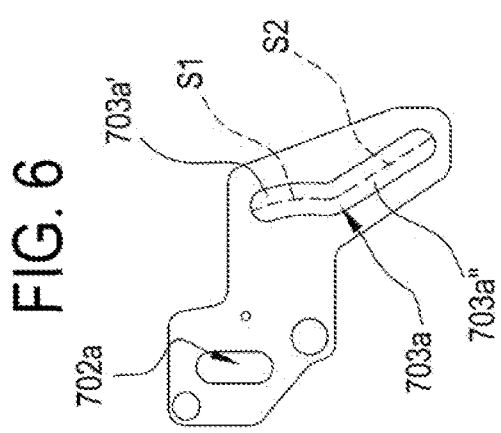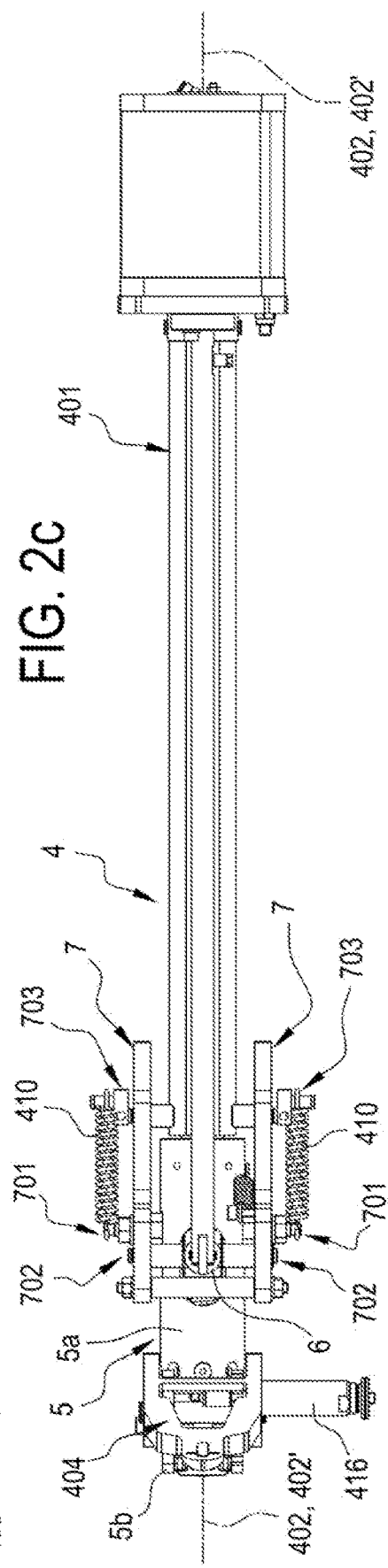

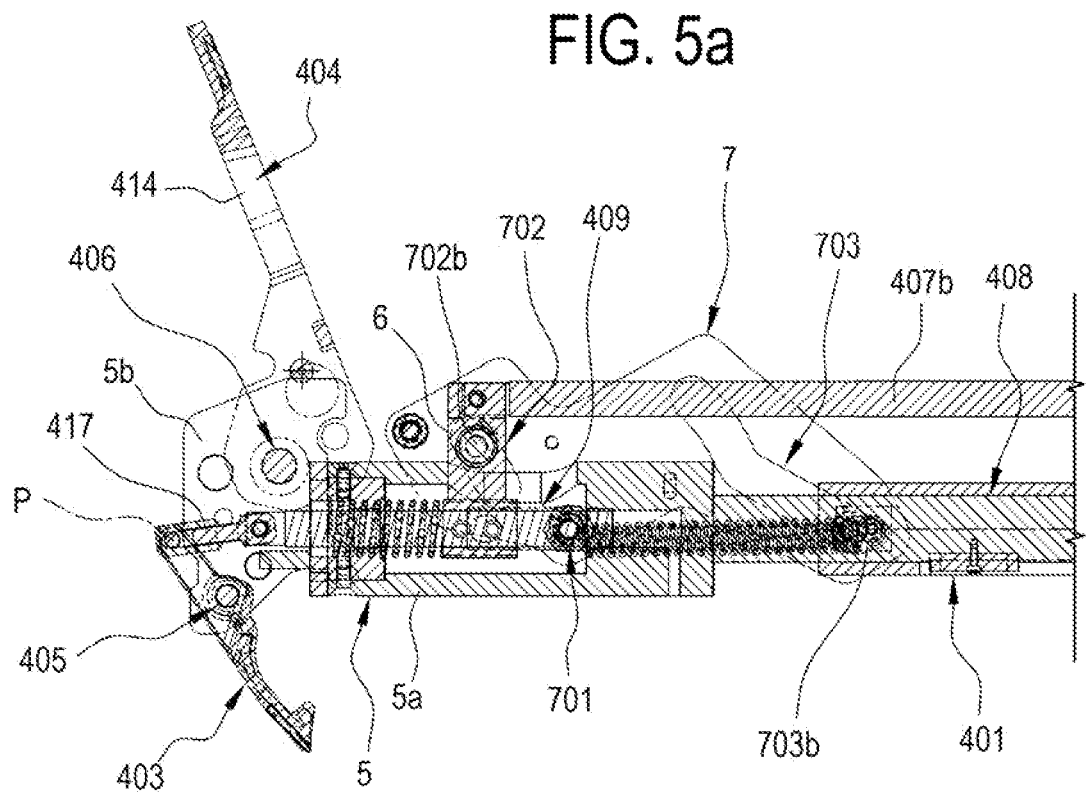

TYRE CHANGING MACHINE

TECHNICAL FIELD OF THE INVENTION

This description relates to a tyre changing machine.

Generally speaking, the term "tyre changing machine" denotes a machine configured to carry out the operations needed to remove a tyre from a respective rim of a vehicle wheel and/or to carry out the operations needed to fit the tyre to the rim.

BACKGROUND OF THE INVENTION

Current tyre changing machines include a wheel-holder unit which is designed to hold securely in place the wheel, comprising rim and tyre or, if the tyre is being fitted, only the rim. The wheel-holder unit defines a main axis which operatively coincides with the axis of the rim when the rim, with or without the tyre, is mounted on the wheel-holder unit. These machines comprise rotation means configured to rotate the wheel-holder unit about the main axis, which thus becomes an axis of rotation of the wheel-holder unit.

These machines can be configured in such a way that the main axis, which, as stated above, operatively coincides with the axis of the rim, is operatively disposed parallel to the force of gravity. Alternatively, the main axis may be transverse, and more specifically, at right angles, to the force of gravity. Usually, in machines configured to operate on large sized and/or heavy wheels, the main axis is parallel to gravity, and hence positioned vertically, in such a way that the rim, when mounted on the wheel-holder unit, lies in a horizontal plane.

These machines include at least one removal and/or mounting tool configured to interact with the wheel-holder unit and the rotation means in order to automatically prise the tyre off the rim, in the case of removal, or to automatically fit the tyre to the rim, in the case of mounting.

Removal devices currently known are described, for example, in patent documents EP1398184B1, EP1916125B1, AN2002A000041, or BI2013A000008.

To remove the tyre from the rim, one currently known device (for example, the one described in patent document EP1398184B1) comprises a demounting tool mounted on the head of the device in order to be able to rotate relative to the head itself.

Removing the tyre comprises an inserting step, carried out with the tool in a first angular operating position relative to the head, where the tool is preferably parallel to the axis of the wheel.

Removing then comprises a step where the demounting tool is placed in a second angular operating position relative to the head, which may be referred to as "locating" or "gripping" step, during which the tool is directed towards the main axis defined by the wheel-holder unit.

After this locating step, removing comprises an extracting step which is carried out at least partly with the demounting tool once again in the first position relative to the head.

During the inserting step, the tool is inserted between the rim and the tyre bead.

By means of a drive system, the demounting tool is moved to the second position, or locating position, relative to the head, where it can interact with the edge of the tyre in order to grip the tyre bead.

More specifically, the movement towards the locating position allows the demounting tool to be wedged firmly between the bead and the rim in such a way as to grip and firmly hold the edge of the bead.

The drive system then moves the demounting tool back to the first position, or neutral position, in order to carry out the next operating step of extracting the bead, which comprises lifting the tool to transfer and hence extract at least a portion of the bead to a position up and over the rim.

The operation by which the bead is extracted can create a significant state of stress in the tyre demounting tool and especially in the tyre bead itself on account of the considerable resistance offered by the tyre mounted or at least still partly mounted on the rim.

This significant state of stress increases tool wear and/or damage to the tyre bead on account of repeated tyre removal operations performed with the tool itself, thereby reducing its working life.

To reduce the stress on the demounting tool and/or on the tyre bead, the technical solution described in patent document EP1398184B1, the demounting tool may be made to perform a roto-translational movement by which the tool, during or immediately after the extracting step, is brought to a third angular position relative to the operating head. In the third angular position, the tool is directed oppositely to the second (locating) position, considering that the first position (neutral) is intermediate between the second and third positions. The roto-translational movement may be operatively considered as a roto-translational movement relative to the rim. This roto-translational movement means that the demounting tool is rotated relative to the operating head towards the third angular position and, at the same time, translated towards the main axis of the wheel-holder unit, preferably in such a way as not to touch the rim.

The technical solution disclosed in patent document EP1398184 B1 can be improved in robustness in terms of the precision of the roto-translational movement. Further, this technical solution comprises a drive system whose mechanical components are subjected to considerable stress during the roto-translational movement.

A device configured both to fit the tyre to the rim and to remove the tyre from the rim is described, for example, in patent document EP1177920B3.

The device in the document just mentioned comprises a head equipped both with a mounting tool and with a removal tool and allows selecting the tool to be used by means of a drive mechanism which is, however, cumbersome and expensive and whose use requires considerable effort because it involves rotating the head on itself in order to orient one or the other between the removal tool and the mounting tool towards the tyre.

SUMMARY OF THE INVENTION

The aim of this invention is to provide a tyre changing machine that overcomes the above mentioned disadvantages of the prior art.

This aim is fully achieved by the tyre changing machine forming the object of this description as characterized in claim 1.

According to a first aspect of it, this description relates to a tyre changing machine configured to remove a tyre from a respective rim of a vehicle wheel.

In a possible embodiment of it, the tyre changing machine comprises a wheel-holder unit adapted to support the wheel while the tyre is being mounted or removed.

According to one aspect of this description, the machine comprises an operating arm.

The operating arm includes a head.

In a possible embodiment, the operating arm includes a supporting structure.

In a possible embodiment, the operating arm is oriented and/or is directed and/or extends along a longitudinal orientation.

The operating arm is operatively positioned relative to the wheel-holder unit in such a way that the longitudinal direction is transverse to, or even at right angles to, the main axis defined by the wheel-holder unit.

In a possible embodiment, the head is movable along a longitudinal axis relative to the supporting structure. The longitudinal axis is parallel to the longitudinal orientation which generically comprises all the infinite axes which are parallel to the longitudinal axis.

The operating arm includes a removal tool pivoted to the head to rotate relative thereto about an axis of oscillation. The axis of oscillation is transverse to the longitudinal orientation and, for example, may be transverse to the longitudinal axis.

In a possible embodiment of the machine, the axis of oscillation might be at right angles to the longitudinal orientation.

In a preferred embodiment, the removal tool is provided with a hooked or claw-like end. The end of the tool is preferably adapted to interact with the tyre bead.

The removal tool is pivoted to the head by means of a first rotational connection which defines the axis of oscillation.

Thanks to this first rotational connection, the removal tool is movable relative to the head by rotation about the axis of oscillation and is linked at least to the translation of the head relative to the supporting structure along the longitudinal axis.

Thanks to this first rotational connection, the removal tool is movable relative to the head by rotation about the axis of oscillation and is linked to the head preferably in all the other movements of the head itself.

The operating head includes a drive member which is movable relative to the supporting structure and/or the head along an operating axis parallel to the longitudinal axis. The driving member is articulated to the removal tool at an operating point which is spaced from the axis of oscillation. In one embodiment, the driving member is articulated to the removal tool through a crank. The crank has a first end, pivotally connected to the removal tool at the operating point, and a second end pivotally connected to the driving member.

The operating arm includes an actuator having at least one stationary member connected to the supporting structure and at least one movable member. The movable member is adapted to drive the removal tool in rotation about the axis of oscillation and relative to the head. The movable member is adapted to drive the removal tool in translation along the longitudinal axis and relative to the supporting structure.

The operating arm includes a coupling member coupled to the supporting structure, to the head and to the driving member.

The movable member of the actuator is connected to the driving member to directly drive it and/or translate it along the operating axis.

The movable member may, for example, comprise a drive rod.

In a possible embodiment, the operating arm comprises a "middle" coupling between the coupling member and the head, a "front" coupling between the coupling member and the driving member and a "rear" coupling between the coupling member and the supporting structure.

Thanks to the middle coupling, the coupling member is operatively movable relative to the head by rotation about a middle axis of rotation. The middle axis of rotation may be transverse or at right angles to the longitudinal orientation.

Thanks to the front coupling, the coupling member is operatively movable relative to the driving member by rotation about a front axis of rotation and/or by translation along the longitudinal orientation or axis. The front axis of rotation may be transverse or at right angles to the longitudinal orientation.

Thanks to the rear coupling, the coupling member is operatively movable relative to the supporting structure by rotation about a rear axis of rotation and/or by translation along the longitudinal orientation or axis. The rear axis of rotation may be transverse or at right angles to the longitudinal orientation.

The middle axis of rotation is defined by the middle coupling.

The middle axis of rotation is preferably parallel to the axis of oscillation of the tool. The middle axis of rotation is preferably linked to the head, in particular at least to the translation thereof relative to the supporting structure along the longitudinal axis. The middle axis of rotation preferably remains fixed relative to the head.

Thanks to the middle axis of rotation, the head is preferably linked to the translation of the coupling member relative to the supporting structure along the longitudinal axis.

Thanks to the middle coupling, the head can preferably only rotate relative to the coupling member about the middle axis of rotation.

The middle coupling preferably comprises a pivot which is fixed relative to the head or the coupling member, whilst the other between the head and the coupling member is rotatable about the pivot.

The pivot defines the middle axis of rotation.

The front axis of rotation is defined by the front coupling.

The front axis of rotation is preferably parallel to the axis of oscillation of the tool relative to the head. The front axis of rotation is preferably parallel to the middle axis of rotation about which the coupling member rotates relative to the head.

The front coupling allows the front axis of rotation to be movable relative to the middle axis of rotation. That way, the coupling member can rotate simultaneously both relative to the head about the middle axis of rotation and relative to the driving member about the front axis of rotation.

The rear axis of rotation is defined by the rear coupling.

The rear axis of rotation is preferably parallel to the axis of oscillation of the tool relative to the head. The rear axis of rotation is preferably parallel to the middle axis of rotation about which the coupling member rotates relative to the head. The rear axis of rotation is preferably parallel to the middle axis of rotation about which the coupling member rotates relative to the driving member.

The rear coupling allows the rear axis of rotation to be movable relative to the middle axis of rotation. That way, the coupling member can rotate simultaneously both relative to the head about the middle axis of rotation and relative to the supporting structure about the rear axis of rotation.

To explain the general configuration of the arm, the following should be considered:
  an angular reference position of the removal tool relative to the head about the axis of oscillation;
  a longitudinal reference position of the removal tool along the longitudinal orientation and relative to the supporting structure.

The operating arm is configured in such a way that these reference positions of the tool correspond to:

a longitudinal reference position of the head along the longitudinal orientation, or along the longitudinal axis, and relative to the supporting structure;

a longitudinal reference position of the driving member along the longitudinal orientation, or along the operating axis, and relative to the supporting structure.

The expression "longitudinal displacement" is used to mean a movement, starting from a respective reference position, relative to the supporting structure along the longitudinal orientation, and hence parallel or along the operating axis, or parallel or along the longitudinal axis.

The expression "angular displacement" is used to mean a movement, caused by a corresponding rotation and starting from a respective reference position, about the axis of oscillation and relative to the head.

Generally speaking, the operating arm is configured in such a way that a longitudinal displacement of the driving member in a feed direction starting from its reference position can cause a longitudinal displacement of the removal tool in the same feed direction.

The operating arm is configured in such a way that a longitudinal displacement of the driving member in the feed direction starting from its reference position can cause an angular displacement of the removal tool (in a corresponding "return" direction of its rotation, or oscillation). This angular displacement is accomplished by rotating the removal tool about the above mentioned axis of oscillation.

Generally speaking, the operating arm is configured in such a way that a longitudinal displacement of the driving member in the feed direction starting from its reference position can cause a longitudinal displacement of the head in the same feed direction.

Generally speaking, the operating arm is configured so that the longitudinal displacements of the driving member and the head differ in intensity or modulus: the greater the angular displacement of the removal tool, the lower the longitudinal displacement of the removal tool.

The return direction referenced to the angular displacement of the removal tool is such that the removal tool is brought towards or into the angular extraction position in which it is operatively directed oppositely to the wheel rim in order to lift the bead above the rim without touching the rim.

Hereinafter, reference to the rotation of the removal tool means a rotation which produces an angular displacement of the removal tool in the return direction of its oscillation about the axis of oscillation.

Preferably, the feed direction of the longitudinal displacement of the driving member is a direction away from the supporting structure.

Hereinafter, reference to the translation of the driving member means a translation which produces a longitudinal displacement of the driving member in the feed direction.

Preferably, also the feed direction of the longitudinal displacement of the removal tool is a direction away from the supporting structure.

Hereinafter, reference to the translation of the removal tool means a translation which produces a longitudinal displacement of the removal tool in the feed direction.

The operating arm is configured in such a way that as the displacement difference along the longitudinal axis increases between the driving member and the head, so the rotation of the removal tool relative to the head, relative to an angular reference position, for example the one mentioned above, also increases.

The operating arm is configured in such a way that if the driving member is translated along the operating axis relative to the supporting structure and also relative to the head, then the removal tool rotates at least relative to the head about the axis of oscillation.

The operating arm is configured in such a way that if the driving member is translated along the operating axis relative to the supporting structure but not relative to the head, then the removal tool is translated along the longitudinal axis relative to the supporting structure.

The operating arm is configured in such a way that if the driving member is translated along the operating axis relative to the supporting structure but not relative to the head, then the possibility of the removal tool rotating relative to the head is prevented or in any event limited compared to the case in which the driving member is translated along the operating axis relative to both the supporting structure and the head.

The front coupling is configured in such a way that translation of the driving member along the operating axis and relative to the supporting structure can cause the front coupling to transmit a driving action, parallel to the longitudinal orientation, between the driving member and the coupling member.

The driving action transmitted between the driving member and the coupling member is such that the translation of the driving member relative to the supporting structure along the operating axis at least tends to cause the coupling member to be translated relative to the supporting structure along the longitudinal axis.

The driving action transmitted between the driving member and the coupling member by means of the front coupling is such that the translation of the driving member relative to the supporting structure along the operating axis preferably at least causes the coupling member to rotate relative to the head about the middle axis of rotation.

As will become clearer as this description continues, the operating arm is preferably configured in such a way that the driving action transmitted between the driving member and the coupling member causes the translation of the driving member relative to the supporting structure along the operating axis to allow the coupling member to be translated relative to the supporting structure along the longitudinal axis, only if the rear coupling allows such translation.

The middle coupling is configured in such a way that translation of the coupling member along the longitudinal axis and relative to the supporting structure can cause the middle coupling to transmit a driving action, parallel to the longitudinal orientation, between the coupling member and the head.

It should be noted that in one embodiment of the arm, it is precisely the head which, thanks to the middle coupling, is linked to the translation of the coupling member along the longitudinal axis.

As will become clearer as this description continues, the operating arm is preferably configured in such a way that the driving action transmitted between the coupling member and the head causes the translation of the coupling member head relative to the supporting structure along the longitudinal axis to allow the head to be translated relative to the supporting structure along the longitudinal axis.

In a possible embodiment of the machine, the longitudinal displacement of the driving member may comprise a first stroke and a second stroke.

The first stroke defines a first segment on the operating axis and/or along the operating axis. The second stroke defines a second segment on the operating axis and/or along the operating axis. The first and second segments are distinct from each other.

The second segment of the operating axis is preferably consecutive and/or adjacent to the first segment of the operating axis.

The rear coupling is configured to regulate the translation of the coupling member relative to the supporting structure along the longitudinal axis depending on whether the driving member is performing the first stroke or the second stroke.

The operating arm is preferably configured in such a way that during the first stroke of the driving member, the rear coupling causes the driving action transmitted between the driving member and the coupling member by means of the front coupling to be "less free" to cause the translation of the coupling member along the longitudinal axis and relative to the supporting structure compared to when the driving member performs the second stroke. At this point, it should be considered that the head is at least coupled to the coupling member by means of the middle coupling and that the middle coupling is adapted to transmit a driving action between the coupling member and the head, parallel to the longitudinal orientation and as a result of the translation of the coupling member along the longitudinal axis and relative to the supporting structure. From this it follows that when the driving member performs the first stroke, the rear coupling causes the driving action transmitted between the driving member and the coupling member by means of the front coupling to also be "less free" to cause the translation of the head along the longitudinal axis and relative to the supporting structure compared to when the driving member performs the second stroke.

From another viewpoint, under equal conditions of longitudinal displacement of the driving member, the head is translated relative to the supporting structure along the longitudinal orientation more when the driving member itself performs the second stroke than when the driving member performs the first stroke. That is because when the driving member performs the first stroke, the head, driven by the coupling member which is in turn driven by the driving member, is less "free" to be translated along the longitudinal axis.

From that it follows that, under equal conditions of longitudinal displacement of the driving member, the removal tool is rotated relative to the head more when the driving member itself performs the first stroke than when the driving member performs the second stroke. That is because when the driving member performs the second stroke, the head, driven by the coupling member which is in turn driven by the driving member, is more "free" to be translated along the longitudinal axis.

In one particular embodiment of the machine, when the driving member performs the first stroke, the rear coupling prevents the driving action transmitted between the driving member and the coupling member by means of the front coupling from causing the coupling member itself to be translated along the longitudinal axis and relative to the supporting structure. In this particular embodiment of the machine, when the driving member performs the first stroke, the coupling member is thus totally prevented from being translated along the longitudinal axis and relative to the supporting structure.

In this particular embodiment of the machine, when the driving member performs the first stroke, the rear coupling not only limits the translation of the coupling member relative to the supporting structure along the longitudinal axis more than when the driving member performs the second stroke but preferably prevents the coupling member from being translated relative to the supporting structure along the longitudinal axis.

Since the head is linked to the coupling member by the middle coupling, at least in its translation relative to the supporting structure along the longitudinal axis, the head in this embodiment, too, is prevented from being translated along the longitudinal axis when the driving member performs the first stroke.

In other words and generally speaking, the rear coupling is configured in such a way that when the driving member performs the first stroke, the driving action exchanged between the driving member and the coupling member by means of the front coupling cannot cause the coupling member to be translated along the longitudinal axis relative to the supporting structure, or in any case, in such a way that the driving action exchanged between the driving member and the coupling member by means of the front coupling can cause the coupling member to be translated in this way but to a more limited extent than when the driving member performs the second stroke.

The operating arm is preferably configured in such a way that when the driving member performs the second stroke, the rear coupling causes the driving action transmitted between the driving member and the coupling member by means of the front coupling to allow the coupling member itself to be translated along the longitudinal axis and relative to the supporting structure. At this point, it should be considered, as stated above, that the head is at least coupled to the coupling member by means of the middle coupling and that the middle coupling is adapted to transmit a driving action between the coupling member and the head, parallel to the longitudinal orientation and as a result of the translation of the coupling member along the longitudinal axis and relative to the supporting structure. From this it follows that when the driving member performs the second stroke, the rear coupling causes the driving action transmitted between the driving member and the coupling member by means of the front coupling to also allow the head to be translated along the longitudinal axis and relative to the supporting structure.

In other words and generally speaking, the rear coupling is configured in such a way that when the driving member performs the second stroke, the driving action exchanged between the driving member and the coupling member by means of the front coupling actually does cause the coupling member, and hence also the head, to be translated along the longitudinal axis relative to the supporting structure, or in any case, in such a way as to cause the coupling member, and hence also the head, to be translated in this way to a greater extent than when the driving member performs the first stroke.

The operating arm is preferably configured in such a way that when the driving member performs the first stroke and/or the second stroke, the driving action exchanged between the driving member and the coupling member by means of the front coupling causes the coupling member itself to rotate about the middle axis of rotation and relative to the head.

In a possible embodiment of the machine, the front coupling is a sliding coupling.

The front coupling defines a front sliding trajectory between the coupling member and the driving member. The front coupling is configured in such a way that the sliding between the coupling member and the driving member along that front sliding trajectory is correlated with a rotation between them about the front axis of rotation and/or a translation between them along the longitudinal axis.

The more the rear coupling allows the coupling member to be translated along the longitudinal axis and relative to the supporting structure, the less the sliding between the coupling member and the driving member along the front sliding trajectory is correlated with a translation between along the longitudinal axis, and the more the sliding between the driving member and the coupling member is correlated with the rotation between them about the front axis of rotation.

In a possible embodiment of the machine, the front sliding coupling between the coupling member and the driving member, comprises a front slot integral with one between the coupling member and the driving member, and a front pin integral with the other between the coupling member and the driving member. The front pin is insertable into the front slot and is slidable along it to define the front sliding coupling.

The front axis of rotation is defined by or linked to the front pin.

In a possible embodiment of the machine, the rear coupling is a sliding coupling.

The rear coupling defines a rear sliding trajectory between the coupling member and the supporting structure. The rear coupling is configured in such a way that the sliding between the coupling member and the supporting structure along that rear sliding trajectory is correlated with a rotation between them about the rear axis of rotation and/or a translation between them along the longitudinal axis.

The operating arm is configured in such a way that when the driving member performs the first stroke, the sliding between the coupling member and the supporting structure is correlated at least with a rotation between them about the rear axis of rotation.

Preferably, the operating arm is configured in such a way that when the driving member performs the first stroke, the sliding between the coupling member and the supporting structure is correlated only with a rotation between them about the rear axis of rotation, while they remain fixed relative to each other along the longitudinal orientation.

The operating arm is configured in such a way that when the driving member performs the second stroke, the sliding between the coupling member and the supporting structure is correlated at least with a translation between them along the longitudinal orientation.

Preferably, the operating arm is configured in such a way that when the driving member performs the second stroke, the sliding between the coupling member and the supporting structure is correlated also with a rotation between them about the rear axis of rotation, while they are in any case translated relative to each other along the longitudinal orientation.

The front sliding trajectory and the rear sliding trajectory can determine a time correlation between the rotation of the tool relative to the head about the axis of oscillation and the translation of the tool along the longitudinal axis and relative to the supporting structure, making it possible to control with a high degree of precision the roto-translational movement of the tool which, besides bringing it to the above mentioned third angular position, or extraction position, also causes it to be translated relative to the rim, in particular causing it to be translated relative to the supporting structure along the longitudinal axis.

The rear and front sliding couplings act in conjunction with each other and with the middle coupling to guarantee a high-precision roto-translational movement to design specifications based on which these couplings are made and positioned relative to each other.

In particular, the rear coupling is configured to apply a regulating action on the coupling member to limit at least partly or prevent or permit the translation of the coupling member relative to the supporting structure along the longitudinal axis and hence also the translation of the head relative to the supporting structure along the longitudinal axis, depending on whether the driving member is performing the first stroke or the second stroke.

The rear sliding trajectory comprises a first sector and a second sector. The first and second sectors of the rear sliding trajectory are contiguous, in the sense that they are adjacent and consecutive along the rear sliding trajectory itself.

Preferably, the middle, rear and front couplings are configured and disposed relative to each other in such a way that when the driving member is translated to perform the first stroke:
 the coupling member and the supporting structure slide relative to each other along the first sector of the rear sliding trajectory;
 the coupling member and the driving member slide relative to each other along the front sliding trajectory.

The rear coupling is configured in such a way that when the coupling member and the supporting structure slide relative to each other along the first sector of the rear sliding trajectory, the coupling member can only rotate relative to the supporting structure about the rear axis of rotation, while translation between the coupling member and the supporting structure along the longitudinal axis is prevented or at least limited more than when the coupling member and the supporting structure slide relative to each other along the second sector of the rear sliding trajectory.

For this purpose, the first sector of the rear sliding trajectory is preferably a curved line. The curved line is, still more preferably, a circular arc.

Preferably, the couplings are configured and disposed relative to each other in, such a way that when the driving member is translated to perform the second stroke:
 the coupling member and the supporting structure slide relative to each other along the second sector of the rear sliding trajectory;
 the coupling member and the driving member slide relative to each other along the front sliding trajectory.

The rear coupling is preferably configured in such a way that when the coupling member and the supporting structure slide relative to each other along the second sector of the rear sliding trajectory, the coupling member and the supporting structure can be rotated relative to each other about the rear axis of rotation, and can also be translated relative to each other along the longitudinal axis more freely than when the coupling member and the supporting structure slide relative to each other along the first sector of the rear sliding trajectory.

For this purpose, the second sector of the rear sliding trajectory extends from the first sector of the same trajectory away from the first sector of the rear sliding trajectory and changes direction relative to the first sector.

If the first sector of the rear sliding trajectory is a curved line, the second sector of the rear sliding trajectory changes direction relative to the curved line defined by the first sector.

If the first sector of the rear sliding trajectory is a circular arc, the second sector of the rear sliding trajectory changes direction relative to that circular arc.

If the first sector of the rear sliding trajectory is a circular arc, the second sector of the rear sliding trajectory extends from the first sector of the rear sliding trajectory away from the centre of that circular arc.

In a possible embodiment, the rear sliding coupling between the coupling member and the supporting structure comprises a rear slot integral with one between the coupling member and the supporting structure, and a rear pin integral with the other between the coupling member and the supporting structure. The rear pin is insertable into the rear slot and is slidable along it to define the rear sliding coupling.

The rear axis of rotation is defined by or linked to the rear pin.

The rear slot comprises a first portion which defines the first sector of the rear sliding trajectory and a second portion which defines the second sector of the rear sliding trajectory.

If the first sector of the rear sliding trajectory is a curved line, the first portion of the rear slot extends along or describes that curved line.

If the first sector of the rear sliding trajectory is a circular arc, the first portion of the rear slot extends along or describes that circular arc.

The couplings are configured in such a way that during the rotation of the coupling member relative to the head about the middle axis of rotation in a first direction and when the rear pin is in the first portion of the rear slot, the front pin is translated along the front slot. In particular, the couplings are configured in such a way that, considering the rotation of the coupling member relative to the head in the first direction, the front pin continues to be translated along the front slot at least until the rear pin can start sliding in the second portion of the rear slot.

In a possible embodiment, the operating arm comprises a "rear" connection between the supporting structure and the head and by means of which the head and the supporting structure can be translated relative to each other along the longitudinal axis.

The rear connection is preferably configured in such a way that the head and the supporting structure can only be translated relative to each other along the longitudinal axis and, in particular, in such a way that they cannot be rotated relative to each other.

In a possible embodiment, the operating arm comprises a "front" connection between the driving member and the head and by means of which the head and the driving member can be translated relative to each other along the longitudinal axis and/or the operating axis.

The front connection is preferably configured in such a way that the head and the driving member can only be translated relative to each other along the longitudinal axis and/or the operating axis and, in particular, in such a way that they cannot be rotated relative to each other.

The operating arm is configured in such a way that rear and front sliding couplings, the middle coupling, and the front and rear connections operate in conjunction with each other to determine a time correlation between the rotation of the tool relative to the head about the axis of oscillation and the translation of the tool relative to the supporting structure along the longitudinal axis.

The time correlation is defined by the time passage of the driving member from the first stroke, during which the longitudinal translation of coupling member and head and hence, removal tool, relative to the supporting structure is "less free" or prevented, to the second stroke, during which the longitudinal translation of coupling member and head and hence, removal tool, relative to the supporting structure is "more free".

In a possible embodiment, the operating arm comprises a front spring.

The operating arm is configured in such a way that the front spring operatively opposes the rotation of the tool relative to the head (about the axis of oscillation) and relative, for example, to the above mentioned angular reference position of the tool about the axis of oscillation and relative to the head. The angular reference position of the tool about the axis of oscillation relative to the head corresponds to an operating reference condition of the front spring. The operating reference condition of the front spring may be a condition in which the front spring is at rest or in static equilibrium.

As stated above, in a possible embodiment, the operating arm is configured in such a way that the translation between driving member and head along the longitudinal axis is made to correspond to the rotation of the removal tool relative to the head about the axis of oscillation.

The front spring is operatively interposed between the head and the driving member or between the head and the movable member of the actuator to oppose their translation relative to each other along the longitudinal axis and hence, to oppose the rotation of the tool relative to the head about the axis of oscillation.

In a possible embodiment, the operating arm comprises a rear spring.

The operating arm is configured in such a way that the rear spring operatively opposes the translation of the coupling member relative to the supporting structure along the longitudinal axis and relative, for example, to the above mentioned reference position of the coupling member, this reference position being along the longitudinal axis and relative to the supporting structure. The longitudinal reference position of the coupling member relative to the supporting structure corresponds to an operating reference condition of the rear spring. The operating reference condition of the rear spring may be a condition in which the rear spring is at rest or in static equilibrium.

The rear spring is operatively interposed between the coupling member and the supporting structure to oppose their translation relative to each other along the longitudinal axis.

In a possible embodiment, the actuator includes a first piston acting on the movable member of the actuator to cause the movement of the driving member along the operating axis at least in a first direction, which may be the above mentioned feed direction.

In a possible embodiment, the actuator includes a second piston acting on the movable member of the actuator to cause the movement of the driving member along the operating axis at least in the first direction or in a second direction opposite to the first direction.

For this purpose, the first and second pistons are preferably connected to the movable member of the actuator.

The stationary member of the actuator defines preferably at least one chamber or two or more chambers where at least one of the pistons can be translated in order to act on the movable member of the actuator.

The first and second pistons apply their respective opposing forces preferably on the stationary member of the actuator.

In a possible embodiment of the operating arm, the arm includes a first tool and a second tool. The first tool may be the removal tool described up to here, pivoted to the head to rotate about the axis of oscillation.

The second tool is also pivoted to the head, by means of a second rotational connection which defines an axis of tilt.

Thanks to this second rotational connection, the second tool is movable relative to the head by rotation about the axis of tilt and is linked at least to the translation of the head relative to the supporting structure along the longitudinal axis.

Thanks to this second rotational connection, the second tool is movable relative to the head by rotation about the axis of tilt and is linked to the head preferably in all the other movements of the head itself.

The axis of tilt may be transverse or at right angles to the longitudinal orientation.

In a first possible embodiment, the head may adopt a first operating configuration and a second operating configuration.

In both operating configurations of the head, the first tool projects from the head and in a first direction.

In the first operating configuration of the head, the second tool is disposed in a first position where it projects from the head in a second direction, opposite to the first direction.

In the second operating configuration of the head, the second tool is disposed in a second position where it projects from the head in the first direction.

The first direction is directed along a first orientation transverse to the longitudinal orientation and/or transverse to both the longitudinal axis and/or the axis of tilt.

The second direction is directed along a second orientation transverse to the longitudinal orientation and/or transverse to both the longitudinal axis and/or the axis of tilt.

The first transverse orientation and the second transverse orientation may coincide.

The second tool can rotate about the axis of tilt to move between the first position and the second position.

The second position of the second tool is tilted upside down relative to the first position. Thus, in the second position, the second tool also projects in the first direction.

In a possible embodiment, the first direction and the second direction are oppositely directed relative to the longitudinal axis or an axis parallel to the longitudinal axis.

In one embodiment, the operating arm may also be configured in such a way that when the head is in its second operating configuration, and thus the second tool is in its second position, the first tool and the second tool act in conjunction to define a mounting tool for fitting the tyre to the rim.

The second tool by itself might in any case constitute the mounting tool.

The operating arm is configured in such a way that when the head is in its second operating configuration, and thus the second tool is in its second position, a first outside surface of the first tool and a second outside surface of the second tool lie on a single position surface transverse to the longitudinal orientation and/or to the longitudinal axis.

In a possible embodiment, the second tool is provided with an opening.

This opening is adapted to receive the first tool, in the second operating configuration of the head, or vice versa.

This opening is adapted for the passage of at least part of the head through the opening when the second tool moves from the first position to the second position or vice versa.

When the second tool is in its second position, it projects from the head in the first direction more than the first tool.

In a possible embodiment, the operating arm includes a locking pin coupled to the second tool and movable between an extracted position where it does not interfere with the movement of the second tool between the first and second positions, and an inserted position where it does interfere with such movement in order to prevent the second tool from moving from the first position to the second position and/or vice versa.

In a possible embodiment, the operating arm comprises a locking spring connected to the locking pin to force it into the inserted position.

The locking pin is connected to a locking spring.

The operating arm is configured in such a way that during the rotation of the second tool between the first and the second position, the locking pin remains in sliding contact with a surface of the head until the second tool reaches the first or the second position, where it automatically moves into the inserted position.

According to a second aspect of it, this description relates to the operating arm, which may have one or more of the features described above with reference to the operating arm.

A tyre changing machine comprising an operating arm according to this description is particularly robust because it reduces the wear and total state of stress in the mechanical components of the machine following repeated use of the machine, compared to machines currently known and used at least for removing tyres.

A tyre changing machine of this kind also makes it possible not to have to move the wheel-holder unit to obtain the roto-translational movement of the removal tool relative to the rim when the tool has to lift the tyre bead above the rim and thus it is also more economical in terms of energy and complexity of machine structure.

A tyre changing machine according to this description also guarantees significant precision in driving the removal tool and/or the mounting tool, or in any case at least one between the first and the second tool, each of which may be the removal tool, the mounting tool or a tool of any other kind.

A tyre changing machine of this kind also allows both removing and fitting the tyre from and to the rim, at least partly or fully automatically, reducing the time needed between the removal and fitting operations and making it possible to pass from one operation to the other quickly and easily and with much less effort than currently known machines.

According to another aspect, this description relates to a method for removing a tyre from a respective rim of a vehicle wheel by means of an operating arm which includes a removal tool pivoted to a head, supported by a supporting structure which supports the operating arm, and a driving member articulated to the removal tool at an operating point.

This removal method comprises the following steps:
displacing the driving member relative to the supporting structure along a longitudinal orientation by means of an actuator connected or interposed between the driving member and the supporting structure;
rotating the removal tool relative to the head under the action of displacing the driving member;
driving a coupling member under the action of displacing the driving member;
displacing the head relative to the supporting structure along the longitudinal orientation and, consequently, also the tool relative to the supporting structure along the longitudinal orientation, as a result of the driving action applied to the head by the coupling member.

The step of displacing the driving member comprises a movement preferably from a retracted position to an advanced position, for example in the above mentioned feed direction.

The retracted position of the driving member may correspond to the above mentioned longitudinal reference position of the driving member.

The step of displacing the driving member from the retracted position to the advanced position thus has as its result at least the step of rotating the removal tool relative to the head, for example in the above mentioned return direction.

The step of displacing the driving member from the retracted position to the advanced position by way of the step of driving the coupling member, thus has as its result at least the step of displacing the removal tool relative to the supporting structure relative to the supporting structure, for example in the above mentioned feed direction.

The displacement of the driving member relative to the supporting structure includes a first stroke along the longitudinal orientation between the retracted position and an intermediate position, and a second stroke along the longitudinal orientation between an intermediate position and the advanced position.

To cause the step of rotating the removal tool relative to the head, the step of displacing the driving member relative to the supporting structure along the longitudinal orientation has as its result, by way of the step of driving the coupling member, a displacement of the driving member relative to the head along the longitudinal orientation.

To cause the step of displacing the removal tool relative to the supporting structure along the longitudinal orientation, the step of displacing the driving member relative to the supporting structure along the longitudinal orientation has as its result, by way of the step of driving the coupling member, a displacement of the head relative to the supporting structure along the longitudinal orientation.

The rotation of the tool relative to the head is correlated with the difference between the displacement of the driving member relative to the supporting structure along the longitudinal orientation and the displacement of the head relative to the supporting structure along the longitudinal orientation, and is thus correlated with the translation of the driving member relative to the head along the longitudinal orientation.

This difference, and thus the translation of the driving member relative to the head along the longitudinal orientation, is regulated by the driving of the coupling member.

During the first stroke, the head is preferably stationary relative to the supporting structure, at least along the longitudinal axis, and the driving member, and thus the operating point of the removal tool, advance both relative to the supporting structure and relative to the head, along the longitudinal orientation.

During the second stroke, the head, the driving member, and thus the operating point of the removal tool, advance relative to the supporting structure along the longitudinal orientation.

The displacement of the driving member relative to the supporting structure along the longitudinal orientation is as a whole greater than the displacement of the head relative to the supporting structure along the longitudinal orientation.

Also imaginable is the case where only the above mentioned second stroke of the driving member relative to the supporting structure along the longitudinal orientation is greater than the displacement of the head relative to the supporting structure along the longitudinal orientation.

In the latter case, the tool rotates relative to the head even for at least a part of the second stroke.

According to a further aspect, this description relates to a method for removing and fitting a tyre respectively from and to a respective rim of a vehicle wheel by means of a head, mounted on an operating arm directed along a longitudinal orientation, a first tool connected to the head and, in a first position of it, projecting from the head in a first direction, and a second tool connected to the head and, in a first position of it, projecting from the head in a second direction.

According to the method, the tyre is removed from the rim by causing the first tool to interact with the tyre during a step of rotating the rim about its axis.

The method comprises a step of rotating the second tool about an axis of tilt transverse to the longitudinal orientation in order to tilt the second tool between a first position and a second position in which it projects in the first direction.

According to the method, the tyre is fitted to the rim by causing a tool, defined by the second tool, to interact independently with the tyre.

According to the method, the tyre might be fitted to the rim by causing a tool, defined by the first tool in its first position in conjunction with the second tool in its second position, to interact with the tyre during a step of rotating the rim about its axis.

According to the method, the tyre might be fitted to the rim by causing only the second tool, to interact with the tyre.

The method may also comprise moving a locking pin from an inserted position to an extracted position before rotating the second tool about the axis of tilt.

BRIEF DESCRIPTION OF THE DRAWINGS

This and other features of the disclosure will become more apparent from the following detailed description of preferred, non-limiting example embodiments of the operating arm, machine and methods with reference to the accompanying drawings, in which:

FIG. 2a shows a side view of the machine of FIG. 1, with a first tool in a neutral or rest position;

FIG. 2b shows the operating arm of FIG. 2a in cross section;

FIG. 2c shows the operating arm of FIG. 2a in a top view;

FIG. 2d shows the operating arm of FIG. 2a in a perspective view;

FIG. 5a illustrates the portion of the operating arm of FIG. 3, with the first tool in the extraction position;

FIG. 5b shows the portion of the operating arm of FIG. 5a in a top view;

FIG. 6 shows a coupling member of the operating arm of FIG. 2a;

DESCRIPTION OF THE PREFERRED EMBODIMENTS

Figure 1:
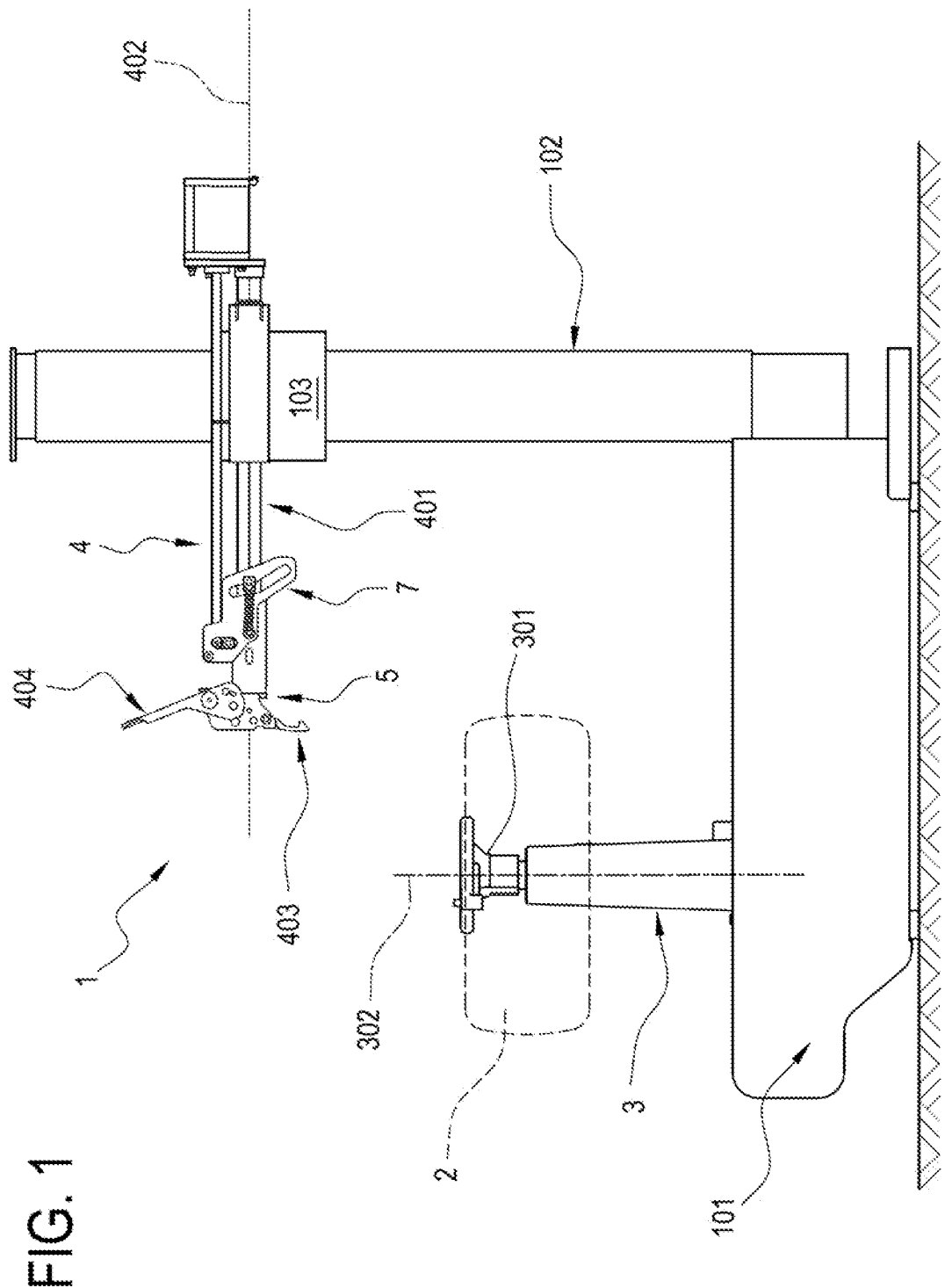
FIG. 1 schematically illustrates a tyre changing machine according to this description.

The numeral 1 in the drawings denotes a tyre changing machine.

The tyre changing machine 1 is configured to at least partly automatically remove a tyre from a respective rim of a vehicle wheel 2. In one embodiment, the tyre changing machine 1 is also configured to at least partly automatically fit a tyre to the respective rim of the wheel 2.

The numeral 101 denotes a base of the machine 1. The numeral 102 denotes a column of the machine 1 whose function is to support equipment useful for the removal and fitting operations. The column 102 extends along an axis of extension not shown in the drawings.

The machine 1 includes a wheel-holder unit 3 which defines a main axis of it. The wheel-holder unit 3 comprises a rotating element 301 which can rotate about an axis of rotation 302 which operatively coincides with the main axis. The wheel-holder unit 3 is configured to set the wheel 2 in rotation about its main axis, which operatively coincides with the axis of rotation 302. In use, the rim of the wheel 2 is locked to the rotating element 301 in such a way that the axis of the wheel 2 is aligned with the axis of rotation 302.

In the example illustrated, the axis of rotation 302 is vertical (parallel to the orientation of the weight force) but in other embodiments, the axis of rotation 302 may be differently oriented: for example, it may be horizontal (transverse to the orientation of the weight force). It should also be noted that in the embodiment illustrated, the axis of extension of the column 102 is parallel to the axis of rotation 302 of the wheel-holder unit 3. In other embodiments, the axis of extension of the column 102 is inclined or perpendicular to the axis of rotation 302 of the wheel-holder unit 3.

The rotating element 301 may be embodied in different ways and the method of locking the rim on the rotating element 301 may vary according to embodiments known in the field of wheel service machines.

In some embodiments, the wheel-holder unit 3 is movable relative to the base 101, relative and/or parallel to an axis of displacement transverse to the axis of rotation 302 (for example, towards and away from the column 102). Preferably, however, the wheel-holder unit 3 is stationary relative to the base 101, so that the axis of rotation 302 has a fixed position relative to the column 102; this simplifies the machine 1.

The machine 1 includes at least one operating arm 4.

The operating arm 4 includes a head 5.

In the example embodiment shown in the accompanying drawings, the head 5 in turn comprises a first part 5a of the head 5 and a second part 5b of the head 5, fixed to each other. The head 5 might also comprise more than two parts or it might be made as a single part.

The operating arm 4 includes a supporting structure 401. The supporting structure 401 constitutes a frame for the operating arm 4.

The operating arm 4 is movably coupled to the column 102 to move relative to the wheel-holder unit 3 between a working position, where at least one tool of the tyre changer can interact with the wheel, and a non-interference or rest position, where the tyre changer tools are away from the wheel.

In one embodiment, the operating arm 4 is movable by translation along the column 102 or along the axis of extension of the column 102. For example, for this purpose, the operating arm 4 is coupled to the column 102 by an interposed slider 103 which is movable by translation along the column 102 or along the axis of extension of the column 102.

In a different embodiment (not illustrated), the operating arm 4 might be movable by rotation relative to the column 102. For this purpose, the operating arm 4 might be coupled to the column 102 to rotate about the axis of extension of the column 102 or about an axis transverse to the axis of extension.

In one embodiment, the operating arm 4 is movable transversely or at right angles to the column 102 or to the axis of extension of the column 102, towards and away from the column 102 or the axis of extension.

The operating arm 4 is directed along a longitudinal orientation.

In an example embodiment of the machine 1, the operating arm 4 extends elongately along a longitudinal axis 402 parallel to the longitudinal orientation.

In one embodiment of the machine 1, the movement of the arm 4 relative to the column 102 and transverse to the column 102 or the axis of extension thereof occurs along the longitudinal axis 402.

For this purpose, in one embodiment of the machine 1, the supporting structure 401 is slidably coupled to (the slider 103 of) the column 102 to be moved translationally along the longitudinal axis 402.

In an example embodiment of the machine 1, the head 5 is movable relative to the supporting structure 401 along a longitudinal axis 402.

The longitudinal axis 402 may have different orientations relative to the column 102 and also relative to the wheel-holder unit 3.

In one embodiment of the machine 1, the operating arm 4 is positioned in such a way that the longitudinal axis 402 of the operating arm 4 is transverse to the axis of rotation 302 of the wheel-holder unit 3, that is to say, in such a way that it lies in a plane transverse to the axis of rotation 302.

In the example shown in the accompanying drawings, the longitudinal axis 402 is at right angles to the axis of rotation 302 of the wheel-holder unit 3, that is, it lies in a plane at right angles to the axis of rotation 302.

In one embodiment of the machine 1, the longitudinal axis 402 of the operating arm 4 is transverse to the axis of extension of the column 102.

In the example shown in the accompanying drawings, the longitudinal axis 402 of the operating arm 4 is at right angles to the axis of extension of the column 102.

In one embodiment of the machine 1, the operating arm 4 is cantilevered to the column 102.

The function of the operating arm 4 is to support one or more tools designed to interact with the tyre of the wheel 2 (for example, for removal, fitting or bead breaking operations).

In an example embodiment, the operating arm 4 includes at least one tool.

In one embodiment, the at least one tool is pivoted to the head 5 to rotate relative thereto about an axis of oscillation. The axis of oscillation may, for example, be transverse or at right angles to the longitudinal orientation. The at least one tool is thus movable relative to the head 5 to rotate about the axis of oscillation.

The at least one tool is pivoted to the head 5 by means of a rotational connection.

The rotational connection is also configured in such a way that the at least one tool is linked to the translation of the head relative to the supporting structure 401 along the longitudinal axis 402.

The rotational connection is preferably configured in such a way that the at least one tool is linked to the head 5 in all the movements of the head 5, except for the possibility of rotating the at least one tool relative to the head 5 about the axis of oscillation.

In one embodiment, the operating arm 4 includes a single tool (a first tool).

In a different embodiment (for example the one illustrated), the operating arm includes a first tool and a second tool, but it might also include more than two tools.

In the embodiment shown in the accompanying drawings, the first tool is a removal tool, labeled 403, and the second tool is a mounting tool, labeled 404.

In another embodiment, the first tool, labeled 403, might be a mounting tool or other type of tool, and the second tool, labeled 404, is a removal tool, or other type of tool. Such other type of tool might, for example, be a bead breaker tool adapted to break the tyre bead in order to allow the tyre to be removed.

With reference to the embodiment shown in the accompanying drawings, the removal tool 403 is pivoted to the head 5 by a first rotational connection 405 to rotate relative thereto about a first axis of rotation transverse to the longitudinal orientation or axis 402. The first axis of rotation may, for reasons which will become clearer as this description continues, be defined axis of oscillation, and is labeled 405'.

In the embodiment shown in the accompanying drawings, the mounting tool 404, too, is pivoted to the head 5, by a second rotational connection 406 to rotate relative thereto about a second axis of rotation transverse to the longitudinal orientation or axis 402. The second axis of rotation may, for reasons which will become clearer as this description continues, be defined axis of tilt, and is labeled 406'.

In one embodiment, at least one between the axis of oscillation 405' and the axis of tilt 406' is at right angles to the longitudinal orientation or longitudinal axis 402. Preferably, the axis of oscillation 405' and the axis of tilt 406' are parallel to each other.

The first rotational connection 405 and the second rotational connection 406 are each configured in such a way that the respective tool 403 or 404 is linked to the translation of the head 5 relative to the supporting structure 401 along the longitudinal axis 402.

The first rotational connection 405 and the second rotational connection 406 are each configured in such a way that the respective tool 403 or 404 is linked to the head 5 in all the movements thereof, except for the possibility of rotating the respective tool 403 or 404 relative to the head 5 about the respective axis of oscillation 405' or axis of tilt 406'.

The first rotational connection 405 and the second rotational connection 406 may each comprise, for example, a pin which embodies the respective axis of oscillation 405' or axis of tilt 406' between the respective first tool 403 or second tool 404 and the head 5.

It should be noted that the above mentioned movements of the operating arm 4 relative to the column 102 (translational parallel and/or transverse to the axis of extension of the column 102, or rotational about that axis) are intended to allow pre-positioning the tools, which are mounted on the operating arm 4, relative to the wheel 2 and, in particular, relative to predetermined zones of the wheel, such as, for example, the rim flange or the tyre bead.

In practice, operatively, the tyre service specialist, after mounting the rim on the wheel-holder unit 3, moves the operating arm 4 to bring the tool connected thereto from a rest or non-interference position (away from the wheel, so as not to interfere with the wheel-holder unit 3 while the wheel is being mounted or while other tools are being used) to a working position, where it is placed in proximity to the predetermined zones of the wheel 2.

This is in preparation for the actual operation to be carried out on the tyre (for example, removal, mounting or bead breaking) during which a tool interacts mechanically with the tyre.

The operating arm 4 includes a movable driving member 6. The driving member 6 is movable, along an operating axis 402' parallel to the longitudinal axis 402 and relative to the supporting structure 401 and to the head 5. In the view from above shown in FIG. 2c, with regard to the embodiment illustrated in the accompanying drawings, the longitudinal 402 and the operating axis 402' are aligned.

The driving member 6 is articulated to the removal tool 403 at an operating point P which is spaced from the axis of oscillation 405'. The operating point P is spaced from the axis of oscillation 405' transversely or at right angles to the axis of oscillation 405' so that the translation of the driving member 6 relative to the axis of oscillation 405' along the longitudinal orientation can make the removal tool 403 rotate relative to the head 5 about the axis of oscillation 405'.

In one example, the driving member 6 is articulated to the removal tool 403 through a crank 417. The crank has a first end, pivotally connected to the removal tool 403 at the operating point, and a second end pivotally connected to the driving member 6.

The operating arm 4 includes an actuator 407 to impart a movement to the driving member 6 along the operating axis 402' and, by the same movement imparted to the driving member 6 along the operating axis 402', to move the removal tool 403 at least by translation relative to the supporting structure 401 along the longitudinal axis 402 and/or by rotation relative to the head 5 about the axis of oscillation 405'. The actuator 407 comprises at least a stationary member 407a and a movable member 407b.

The stationary member 407a is connected to the supporting structure 401 and is preferably fixed to the supporting structure 401.

The movable member 407b is adapted to drive the removal tool 403, by driving the driving member 6 along the operating axis 402', in rotation relative to the head 5 about the axis of oscillation 405' and in translation along the longitudinal axis 402 relative to the supporting structure 401. The movable member 407b of the actuator 407 is connected to the driving member 6 to directly drive it along the operating axis 402'.

The movable member 407b of the actuator 407 is, in the embodiment of the machine 1 shown in the accompanying drawings, at least partly rigidly connected to the driving member 6, at least as regards translation along the operating axis 402'.

In the embodiment illustrated, the movable member 407b of the actuator 407 is connected to the driving member 6 in such a way as to remain completely fixed to the driving member 6 during translation of the driving member 6 and/or of the movable member 407b along the longitudinal orientation or operating axis 402'.

In the embodiment shown, the movable member 407b comprises an operating rod.

The operating arm 4 is configured in such a way that a movement of the driving member 6 parallel to the longitudinal axis 402 relative to the supporting structure 401 but not relative to the head 5, corresponds to a translation of the head 5 and of the removal tool 403 relative to the supporting structure 401 along the longitudinal axis 402.

The operating arm 4 is configured in such a way that a movement of the driving member 6 parallel to the longitudinal axis 402 relative to the supporting structure 401 and also relative to the head 5, corresponds at least to a rotation of the removal tool 403 relative to the head 5 about the axis of oscillation 405'.

The operating arm 4 includes a coupling member 7. The coupling member 7 is coupled to the supporting structure 401, to the head 5 and to the driving member 6.

In one embodiment, the operating arm 4 comprises a middle coupling 701 between the coupling member 7 and the head 5.

The middle coupling 701 is configured in such a way that the coupling member 7 is operatively movable relative to the head 5 by rotation about a middle axis of rotation 701'.

The middle axis of rotation 701' is, in one embodiment, parallel at least to the axis of oscillation 405' of the removal tool 403.

The middle axis of rotation 701' is linked (or fixed) to the head 5, in particular being linked at least to the translation of the head 5 relative to the supporting structure 401 along the longitudinal axis 402.

In one embodiment, the operating arm 4 comprises a front coupling 702 between the coupling member 7 and the driving member 6, and a rear coupling 703 between the coupling member 7 and the supporting structure 401.

The front coupling 702 is configured in such a way that the coupling member 7 is operatively movable relative to the driving member 6 by translation along the longitudinal axis 402.

The front coupling 702 is configured in such a way that the coupling member 7 is operatively movable relative to the driving member 6 by rotation about a front axis of rotation 702'.

In one embodiment, the front coupling 702 can allow a roto-translation between the coupling member 7 and the driving member 6, comprising a rotation about the front axis of rotation 702' and a simultaneous translation along the longitudinal orientation or the longitudinal axis 402.

The front axis of rotation 702' is, in one embodiment, parallel to the axis of oscillation 405' of the removal tool 403.

The front axis of rotation 702' is, in one embodiment, parallel at least to the middle axis of rotation 701'.

The front coupling 702 allows the front axis of rotation 702' to be movable relative to the middle axis of rotation 701'. That way, the coupling member 7 can rotate simultaneously relative to the head 5 about the middle axis of rotation 701' and relative to the driving member 6 about the front axis of rotation 702'.

The front coupling 702 is thus configured in such a way that the rotation of the coupling member 7 relative to the head 5 about the middle axis of rotation 701' causes a simultaneous rotation of the coupling member 7 relative to the driving member 6 about the front axis of rotation 702'.

In one embodiment, as mentioned above, the operating arm 4 comprises the rear coupling 703 between the coupling member 7 and the supporting structure 401.

The rear coupling 703 is configured in such a way that the coupling member 7 is operatively movable relative to the supporting structure 401 by translation along the longitudinal axis 402.

The rear coupling 703 is configured in such a way that the coupling member 7 is operatively movable relative to the supporting structure 401 by rotation about a rear axis of rotation 703'.

In the embodiment illustrated, under certain conditions which will become clearer as this description continues, the rear coupling 703 can allow a roto-translation between the coupling member 7 and the supporting structure 401, comprising a rotation about the rear axis of rotation 703' and a simultaneous translation along the longitudinal orientation or the longitudinal axis 402.

The rear axis of rotation 703' is, in one embodiment, parallel to the axis of oscillation 405' of the removal tool 403.

The front axis of rotation 703' is, in one embodiment, parallel to the middle axis of rotation 701'.

The rear axis of rotation 703' is, in one embodiment, parallel to the front axis of rotation 702'.

The rear coupling 703 allows the rear axis of rotation 703' to be movable relative to the middle axis of rotation 701'. That way, the coupling member 7 can rotate simultaneously relative to the head 5 about the middle axis of rotation 701' and relative to the supporting structure 401 about the rear axis of rotation 703'.

The rear coupling 703 is thus configured in such a way that the rotation of the coupling member 7 relative to the head 5 about the middle axis of rotation 701' causes a simultaneous rotation of the coupling member 7 relative to the supporting structure 401 about the rear axis of rotation 703'.

The rear coupling 703, middle coupling 701 and front coupling 702 are configured in such a way as to make the middle axis of rotation 701', front axis of rotation 702' and rear axis of rotation 703' movable relative to each other. That way, the coupling member 7 can rotate simultaneously relative to the head 5 about the middle axis of rotation 701' relative to the supporting structure 401 about the rear axis of rotation 703' and relative to the driving member 6 about the front axis of rotation 702'.

In one embodiment, the head 5 is movable with respect to the supporting structure 401; in one embodiment, the head 5 is movable with respect to the supporting structure 401 by translation.

In one embodiment, the driving member 6 slidably coupled to the supporting structure 401; in one embodiment, driving member 6 coupled to the supporting structure 401 and is constrained to translate without rotating, with respect to the supporting structure 401.

The following are considered:
an angular reference position of the removal tool 403 relative to the head 5 about the axis of oscillation 405', for example the angular position of the removal tool 403 shown in FIGS. 2a-2b, which may be considered the neutral position;
a longitudinal reference position of the removal tool 403 along the longitudinal orientation and relative to the supporting structure 401, for example the longitudinal position of the removal tool 403 shown in FIGS. 2a-2b.

The operating arm 4 is configured in such a way that these reference positions of the removal tool 403 correspond to:
a longitudinal reference position of the removal tool 5 along the longitudinal orientation, or the longitudinal axis 402, and relative to the supporting structure 401, for example the longitudinal position of the head 5 shown in FIGS. 2a-2b;
a longitudinal reference position of the driving member 6 along the longitudinal orientation, or the operating axis 402', and relative to the supporting structure 401, for example the longitudinal position of the driving member 6 shown in FIGS. 2a-2b.

The expression "longitudinal displacement" is used to mean a movement, starting from a respective reference position, relative to the supporting structure 401 along the longitudinal orientation, and hence parallel or along the operating axis 402', or parallel or along the longitudinal axis 402.

The expression "angular displacement" is used to mean a movement, caused by a corresponding rotation and starting from a respective reference position, about the axis of oscillation 405' and relative to the head 5.

Generally speaking, the operating arm 4 is configured in such a way that a longitudinal displacement of the driving member 6 in a feed direction (arrow F1, FIG. 2a) starting from its reference position can, under certain conditions defined by the joint action of the aforementioned couplings 701-703, cause a longitudinal displacement of the removal tool 403 in the same feed direction.

That feed direction of the longitudinal displacement of the driving member 6 is a direction away from the supporting structure 401, for example parallel to the arrow F1 of FIG. 2a.

That feed direction of the longitudinal displacement of the removal tool 403 is also a direction away from the supporting structure 401, for example parallel to the arrow F1 of FIG. 2a.

Figure 4:
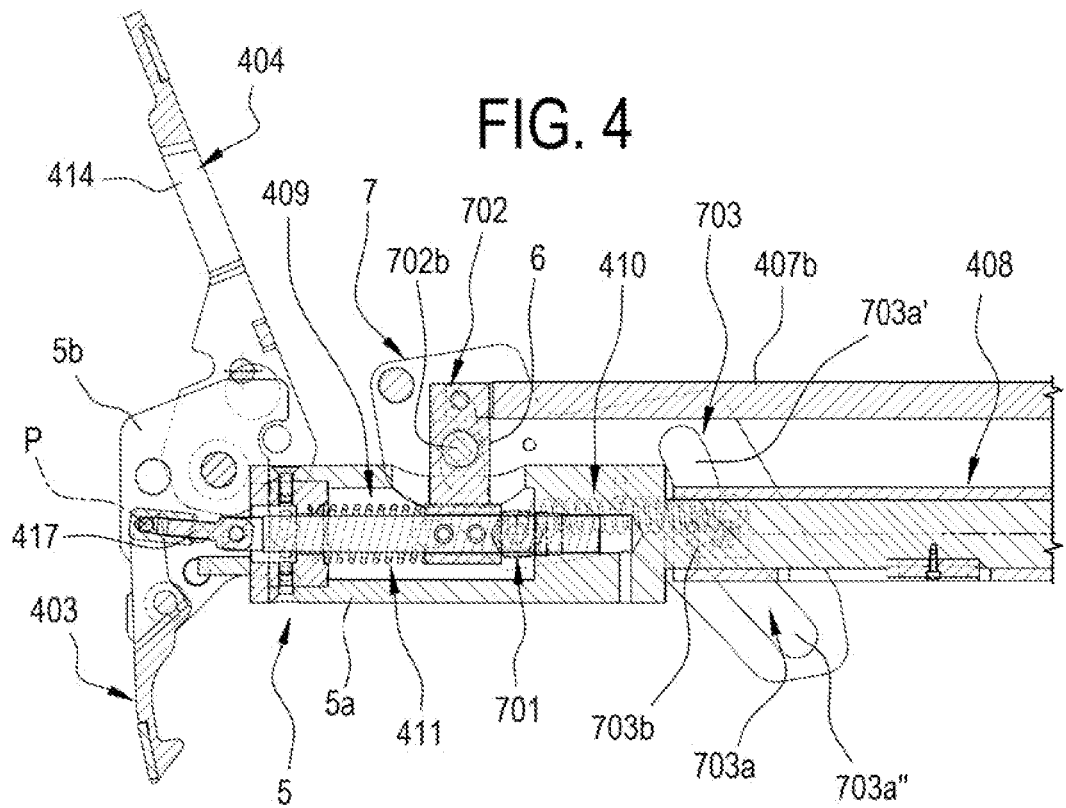
FIG. 4 illustrates the portion of the operating arm of FIG. 3, with the first tool in a position intermediate between the locating position and an extraction position.
Figure 7:
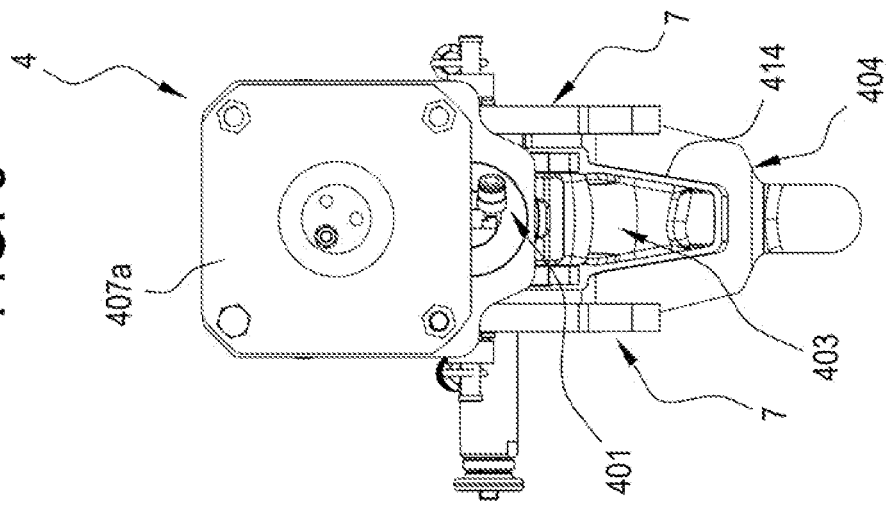
FIG. 7 shows the operating arm of FIG. 2a in a rear view.
Figure 8:
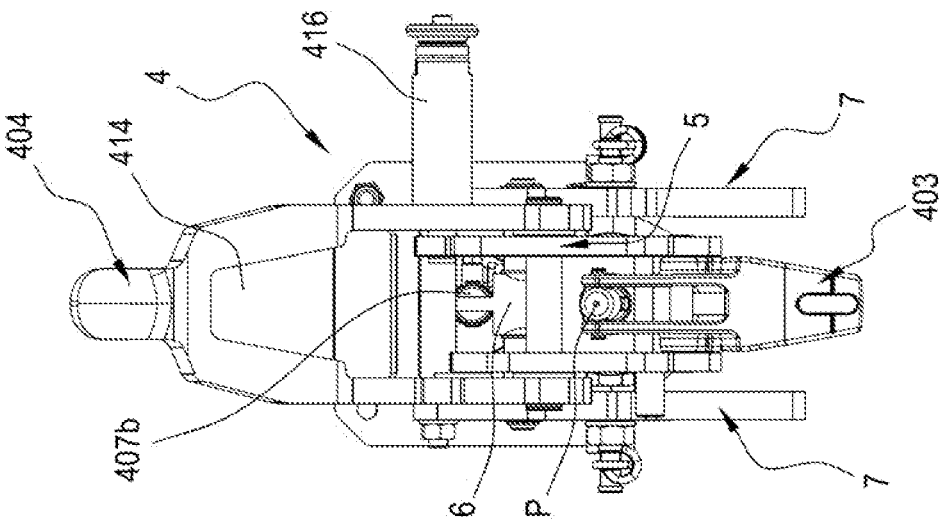
FIG. 8 shows the operating arm of FIG. 2a in a front view.

The longitudinal displacement of the removal tool 403 in that feed direction occurs, in the embodiment illustrated, between FIG. 4 and FIG. 5a.

Generally speaking, the operating arm 4 is configured in such a way that a longitudinal displacement of the driving member 6 in that feed direction (arrow F1, FIG. 2a) starting from its reference position can, under certain conditions defined by the joint action of the aforementioned couplings 701-703, cause an angular displacement of the removal tool 403 in a "return" direction.

The return direction referenced to the angular displacement of the removal tool 403 is such that the removal tool 403 is brought towards or into the angular extraction position in which it is operatively directed oppositely to the wheel rim in order to lift the bead above the rim without touching the rim. The angular displacement of the removal tool 403 in that return direction occurs, in the embodiment illustrated, between FIGS. 2a-2b and FIG. 4 and, to greater extent, between FIG. 4 and FIG. 5a.

In FIG. 4, the removal tool is located at an angular position intermediate between the reference, or neutral, position of FIG. 2a and the extraction position of FIG. 5a.

Generally speaking, the operating arm 4 is configured in such a way that a longitudinal displacement of the driving member 6 in that feed direction (arrow F1, FIG. 2a) starting from its reference position can, under certain conditions defined by the joint action of the aforementioned couplings 701-703, cause a longitudinal displacement of the head 5 in the same feed direction.

Generally speaking, the operating arm 4 is configured so that the longitudinal displacements of the driving member 6 and the head 5 differ in intensity or modulus: the greater the angular displacement of the removal tool 403, the lower the longitudinal displacement of the removal tool 403.

The front coupling 702 is configured in such a way that the driving member 6, during the translation of the driving member 6 along the operating axis 402' applies a driving action on the coupling member 7. This driving action is designed to couple the translation of the driving member 6 along the operating axis 402' relative to the supporting structure 401 to the rotation of the coupling member 7 about the middle axis of rotation 701' relative to the head 5.

The starting situation considered is that shown in FIGS. 2a-2b, where the removal tool 403 is at an angular, or neutral, reference position relative to the head 5 about the axis of oscillation 405'.

The end situation considered is that shown in FIG. 4, where the removal tool 403, relative to the head 5 about the axis of oscillation 405', is at an angular reference position intermediate between the neutral or reference position and the angular extraction position. The angular extraction position of the removal tool 403 is shown in FIG. 5a.

Another end situation that might be considered is that shown in FIG. 5a, where the removal tool 403 is, precisely, at the angular extraction position.

Let us consider the possibility, by means of the movable member 407b of the actuator 407, of translating the driving member 6 along the operating axis 402' relative to the supporting structure 401 away from the stationary member 407a of the actuator 407, for example in the direction indicated by the arrow F1 in FIG. 2a. In such a case, the tool 403 will tend to rotate about the axis of oscillation 405' towards the extraction position of FIG. 5a, as will become clearer as this description continues.

The translation of the driving member 6 relative to the supporting structure 401 along the operating axis 402' in the direction indicated by the arrow F1, for example between the situation of FIGS. 2a-2b and the situation of FIG. 4 or 5a, causes the coupling member 7 to rotate, by means of the front coupling 702, about the middle axis of rotation 701' relative to the head 5 in a first direction. This rotation of the coupling member 7 relative to the head 5 about the middle axis of rotation 701' is permitted by the rear coupling 703, as will become clearer as this description continues.

Figure 3:
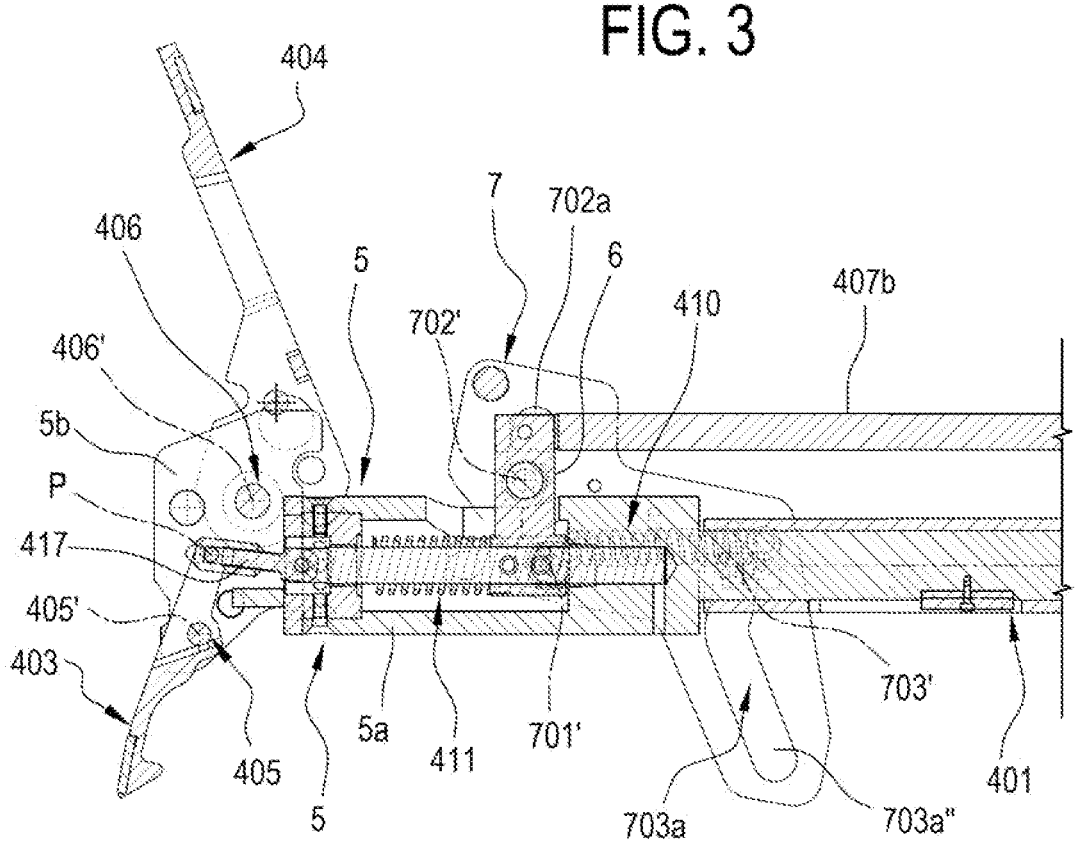
FIG. 3 illustrates a portion of the operating arm of FIG. 2b, with the first tool in a locating position.

Excepting the direction of rotation of the coupling member 7, this occurs even if the end situation considered is that shown in FIG. 3, where the removal tool 403, relative to the head 5 about the axis of oscillation 405', is at the angular locating position. In such case, to pass from the starting situation of FIGS. 2a-2b to the end situation of FIG. 3, it is necessary to translate the driving member 6 along the operating axis 402' relative to the supporting structure 401 towards the stationary member 407a of the actuator 407, for example in the direction indicated by the arrow F2 in FIG. 2a.

The translation of the driving member 6 relative to the supporting structure 401 along the operating axis 402' in the direction indicated by the arrow F2, for example between the situation of FIGS. 2a-2b and the situation of FIG. 3, causes the coupling member 7 to rotate, by means of the front coupling 702, about the middle axis of rotation 701' relative to the head 5 in a second direction, opposite to the first direction.

The front coupling 702 defines a front sliding trajectory between the coupling member 7 and the driving member 6. In the embodiment illustrated, the front sliding trajectory lies in a plane which is parallel, for example, to FIGS. 2a-2b.

The sliding between the coupling member 7 and the driving member 6 along that front sliding trajectory is correlated with the rotation between them about the front axis of rotation 702' and the translation between them along the longitudinal axis 402.

The front coupling 702 comprises a front slot 702a integral with one between the coupling member 7 and the driving member 6, and a front pin 702b integral with the other between the coupling member 7 and the driving member 6. The front pin 702b is insertable into, and slidable along, the front slot 702a.

The front pin 702b defines the front axis of rotation 702' which is thus linked to the front pin 702b.

In the embodiment shown in the accompanying drawings, the front slot 702a belongs to the coupling member 7 and the front pin 702b belongs to the driving member 6.

The front sliding trajectory is defined by the front slot 702a, and the sliding between the coupling member 7 and the driving member 6 along that front sliding trajectory is operatively defined by the sliding of the front pin 702*b* along the front slot 702*a*.

The rear coupling 703 is configured to apply a regulating action on the coupling member 7 during the translation of the driving member 6 along the operating axis 402', in order to regulate and, in particular, limit at least partly the translation of the coupling member 7 along the longitudinal axis (or orientation) 402 and relative to the supporting structure 401, and to correlate it with the rotation of the coupling member 7 relative to the head 5 about the middle axis of rotation 701'.

As regards the displacement of the driving member 6 along the operating axis 402', in one possible embodiment, this displacement includes a first stroke and a second stroke.

The first stroke along the operating axis 402' defines a first segment along the operating axis 402' such that when the driving member 6 travels it in the direction of the arrow F1, the driving member 6 passes from the situation shown in FIGS. 2*a*-2*b*, where the removal tool 403 is at the neutral position, to the situation shown in FIG. 4, where the removal tool 403 is at an intermediate position.

The second stroke (along the operating axis 402') defines a second segment along the operating axis such that when the driving member 6 travels it in the direction of the arrow F1, the driving member 6 passes from the situation shown in FIG. 4, where the removal tool 403 is at the intermediate position to the situation shown in FIGS. 5*a*-5*b*, where the removal tool 403 is at the extraction position.

In a possible embodiment, the displacement of the driving member 6 along the operating axis 402' may also include a third stroke.

The third stroke (along the operating axis 402') defines a third segment along the operating axis 402' such that when the driving member 6 travels it in the direction of the arrow F2, the driving member 6 passes from the situation shown in FIGS. 2*a*-2*b*, where the removal tool 403 is at the neutral position, to the situation shown in FIG. 3, where the removal tool 403 is at the locating position.

The second stroke (second segment of the operating axis 402') is adjacent to, and consecutive upon, the first stroke (first segment of the operating axis 402').

The third stroke (third segment of the operating axis 402') is adjacent to, and consecutive upon, the first stroke (first segment of the operating axis 402') but on the opposite side to the second stroke (second segment of the operating axis 402').

The third stroke (third segment of the operating axis 402') of the driving member 6 and the second stroke (second segment of the operating axis 402') of the driving member 6 are located on mutually opposite sides of the first stroke (first segment of the operating axis 402') of the driving member 6.

In the embodiment shown in the accompanying drawings, that regulating action, during the first stroke of the driving member 6, is designed to prevent translation of the coupling member 7 along the longitudinal axis 402 relative to the supporting structure 401.

In the embodiment shown in the accompanying drawings, the regulating action of the rear coupling 703, during the first stroke of the driving member 6, is designed to allow only rotation of the coupling member 7 relative to the head 5 about the middle axis of rotation 701'.

In the embodiment shown in the accompanying drawings, that regulating action, during the second stroke of the driving member 6, is designed to allow translation of the coupling member 7 along the longitudinal axis 402 relative to the supporting structure 401.

In the embodiment shown in the accompanying drawings, that regulating action, during the second stroke of the driving member 6, is designed to also allow rotation of the coupling member 7 relative to the head 5 about the middle axis of rotation 701'.

Thus, in the embodiment shown in the accompanying drawings, the removal tool 403, during the first stroke of the driving member 6, is rotated relative to the head 5 but is not translated relative to the supporting structure 401 along the longitudinal axis 402. That is because the removal tool 403 is linked to the translation of the head 5 relative to the supporting structure 401 along the longitudinal axis 402 by means of the first rotational connection 405, and the head 5 is linked to the translation of the coupling member 7 relative to the supporting structure 401 along the longitudinal axis 402 by means of the middle coupling 701. Since the coupling member 7, during the first stroke of the driving member 6, cannot be translated relative to the supporting structure 401 along the longitudinal axis 402, it follows that the removal tool 403, during the first stroke of the driving member 6, is subjected only to rotation relative to the head 5 about the axis of oscillation 405'.

Thus, in the embodiment shown in the accompanying drawings, the removal tool 403, during the second stroke of the driving member 6, is at least translated relative to the supporting structure 401 along the longitudinal axis 402. That is because the removal tool 403 is linked to the translation of the head 5 relative to the supporting structure 401 along the longitudinal axis 402 by means of the first rotational connection 405, and the head 5 is linked to the translation of the coupling member 7 relative to the supporting structure 401 along the longitudinal axis 402 by means of the middle coupling 701. Since the coupling member 7, during the second stroke of the driving member 6, can be translated relative to the supporting structure 401 along the longitudinal axis 402, it follows that the removal tool 403, during the second stroke of the driving member 6, is subjected at least to translation along the longitudinal axis 402 relative to the supporting structure 401.

In the embodiment shown in the accompanying drawings, the removal tool 403, even during the second stroke of the driving member 6, is rotated relative to the head 5 about the axis of oscillation 405'. That is because, even during the second stroke of the driving member 6, the coupling member 7 is in any case less free to be translated than the driving member 6 and therefore, the removal tool 403, even during the second stroke of the driving member 6, is rotated relative to the head 5 about the axis of oscillation 405'.

It should be noted that in the embodiment illustrated, the angular displacement of the tool 403 between FIGS. 2*a*-2*b* and FIG. 4, caused by the first stroke of the driving member 6, is smaller than the angular displacement of the tool 403 between FIG. 4 and FIGS. 5*a*-5*b*, caused by the second stroke of the driving member 6. In any case, under equal conditions of longitudinal displacement and thus, per unit of longitudinal displacement of the driving member 6, the angular displacement of the tool 403 is greater during the passage from FIGS. 2*a*-2*b* to FIG. 4 and thus, during the first stroke of the driving member 6, than it is during the passage from FIG. 4 to FIGS. 5*a*-5*b*, and thus, during the second stroke of the driving member 6.

In the embodiment shown in the accompanying drawings, the regulating action of the rear coupling 703, during the third stroke of the driving member 6, is designed to prevent translation of the coupling member 7 along the longitudinal axis 402 relative to the supporting structure 401.

In one embodiment, the coupling member 7 is movable relative to the supporting structure 401 by rotation and translation along a sliding trajectory comprising a first sector S1 and a second sector S2 which are distinct from each other.

In the embodiment shown in the accompanying drawings, that regulating action, during the third stroke of the driving member 6, is designed to allow only rotation of the coupling member 7 relative to the head 5 about the middle axis of rotation 701'.

Thus, in the embodiment shown in the accompanying drawings, the removal tool 403, during the third stroke of the driving member 6, is rotated relative to the head 5 but is not translated relative to the supporting structure 401 along the longitudinal axis 402. That is because the removal tool 403 is linked to the translation of the head 5 relative to the supporting structure 401 along the longitudinal axis 402 by means of the first rotational connection 405, and the head 5 is linked to the translation of the coupling member 7 relative to the supporting structure 401 along the longitudinal axis 402 by means of the middle coupling 701. Since the coupling member 7, during the third stroke of the driving member 6, cannot be translated relative to the supporting structure 401 along the longitudinal axis 402, it follows that the removal tool 403, during the third stroke of the driving member 6, is subjected only to rotation relative to the head 5 about the axis of oscillation 405'.

The rear coupling 703 defines a rear sliding trajectory between the coupling member 7 and the supporting structure 401. In the embodiment illustrated, the rear sliding trajectory lies in a plane which is parallel, for example, to the longitudinal axis 402.

The sliding between the coupling member 7 and the supporting structure 401 along that rear sliding trajectory is correlated with the rotation between them about the rear axis of rotation 703' and the translation between them along the longitudinal axis 402.

The rear coupling 703 applies the regulating action by means of the rear sliding trajectory whose shape contributes, during the translation of the driving member 6 along the operating axis 402', to determining a correlation between the rotation of the coupling member 7 relative to the head 5 about the middle axis of rotation 701' and the translation of the coupling member 7 along the longitudinal axis 402 relative to the supporting structure 401.

The rear sliding trajectory comprises a first sector S1 and a second sector S2. The first sector S1 and the second sector S2 of the rear sliding trajectory are contiguous, in the sense that they are adjacent and consecutive along the rear sliding trajectory itself.

The first sector S1 is preferably a curved line. In the embodiment illustrated, the first sector S1 is a circular arc.

In the embodiment illustrated, during the first stroke of the driving member 6 and thus, between the situation of FIGS. 2a-2b and the situation of FIG. 4:
- the coupling member 7 slides relative to the supporting structure 401 along the first sector S1 of the rear sliding trajectory;
- the coupling member 7 slides relative to the driving member 6 along the front sliding trajectory.

The second sector S2 extends from the first sector S1 away from the first sector S1 and changes direction relative to the first sector.

In the embodiment illustrated, during the second stroke of the driving member 6 and thus, between the situation of FIG. 4 and the situation of FIG. 5a:
- the coupling member 7 slides relative to the supporting structure 401 along the second sector S2 of the rear sliding trajectory;
- the coupling member 7 slides relative to the driving member 6 along the front sliding trajectory.

More specifically, if the first sector S1 is a curved line, the second sector S2 changes direction relative to that curved line. In the embodiment shown in the accompanying drawings, where the first sector S1 is a circular arc, the second sector S2 changes direction relative to that circular arc.

More specifically, if the first sector S1 is a circular arc, the second sector S2 extends from the first sector S1 away from the centre of that circular arc.

The rear sliding coupling 703 comprises a rear slot 703a integral with one between the coupling member 7 and the supporting structure 401, and a rear pin 703b integral with the other between the coupling member 7 and the supporting structure 401. The rear pin 703b is insertable into, and slidable along, the rear slot 703a. In the embodiment shown in the accompanying drawings, the rear slot 703a belongs to the coupling member 7 and the rear pin 703b belongs to the supporting structure 401.

The rear sliding trajectory is defined by the rear slot 703a, and the sliding between the coupling member 7 and the supporting structure 401 along that rear sliding trajectory is operatively defined by the sliding of the rear pin 703b along the rear slot 703a.

The rear slot 703a comprises a first portion 703a' which defines the first sector S1 of the rear sliding trajectory.

If the first sector S1 is a curved line, the first portion 703a' extends along or describes that curved line.

If the first sector S1 is a circular arc, the first portion 703a' extends along or describes that circular arc.

The rear slot 703a comprises a second portion 703a" which defines the second sector S2 of the rear sliding trajectory.

The middle coupling 701, front coupling 702 and rear coupling 703 are configured in such a way that:
- during the first stroke and/or the third stroke of the driving member 6 in the direction of the arrow F1 or in the direction of the arrow F2, respectively, and thus between the situation of FIG. 2a and the situation of FIG. 4 or FIG. 3, respectively, the front pin 702b slides in the front slot 702a and the rear pin 703b slides in the first portion 703a' of the rear slot 703a, and the coupling member 7 rotates relative to the head 5 about the middle axis of rotation 701' relative to the driving member 6 about the front axis of rotation 702' and relative to the supporting structure 401 about the rear axis of rotation 703'.
- during the first stroke and/or the third stroke of the driving member 6, the coupling member 7 remains fixed along the longitudinal axis 402 relative to the supporting structure 401, thanks to the shape of the first portion 703a' of the rear slot 703a;
- during the first stroke and/or the third stroke of the driving member 6, the removal tool 403 rotates relative to the head 5 about the axis of oscillation 405', considering that the head 5 remains fixed along the longitudinal axis 402 relative to the supporting structure 401 since the head 5, during the movement of the coupling member 7 in its translation along the longitudinal axis 402, moves as one with the coupling member 7, because it is linked (integral) to the coupling member 7 through the middle coupling 701 (coupled between the head 5 and the coupling member 7);

during the second stroke of the driving member 6 in the direction of the arrow F1 and thus between the situation of FIG. 4 and that of FIGS. 5a-5b, the front pin 702b slides in the front slot 702a, the rear pin 703b slides in the second portion 703a" of the rear slot 703a, and the coupling member 7 rotates relative to the head 5 about the middle axis of rotation 701' relative to the driving member 6 about the front axis of rotation 702' and relative to the supporting structure 401 about the rear axis of rotation 703';

during the second stroke of the driving member 6 in the direction of the arrow F1 and thus between the situation of FIG. 4 and that of FIG. 5a, the coupling member 7 is also translated relative to the supporting structure 401 along the longitudinal axis 402, thanks to the shape of the second portion 703a" of the rear slot 703a;

during the second stroke of the driving member 6, the removal tool 403 is translated relative to the supporting structure 401 relative along the longitudinal axis 402 since the head 5 is driven translationally along the longitudinal axis 402 relative to the supporting structure 401 by means of the middle coupling 701 between the head 5 and the coupling member 7.

That way, during the removal of the tyre, with reference to the first and second strokes of the driving member 6, when the bead is extracted above the rim, a roto-translational movement can be imparted to the removal tool 403 with a high degree of precision thanks to a robust driving mechanism.

In one embodiment, the operating arm 4 comprises a rear connection 408 between the supporting structure 401 and the head 5. The rear connection 408 is configured to allow the supporting structure 401 and the head 5 to be translated relative to each other along the longitudinal axis 402.

The rear connection 408 is preferably configured in such a way as to prevent at least one of the other possible movements between the head 5 and the supporting structure 401: for example, their rotation relative to each other. The rear connection 408 is preferably configured in such a way as to prevent all the other possible movements between the head 5 and the supporting structure 401 except for their translation relative to each other along the longitudinal axis 402.

The head 5 is thus coupled to the supporting structure 401 and is constrained to be translated without rotating relative thereto.

In one embodiment, the operating arm 4 comprises a front connection 409 between the driving member 6 and the head 5. The front connection 409 is configured to allow the driving member 6 and the head 5 to be translated relative to each other along the longitudinal axis 402.

The front connection 409 is preferably configured in such a way as to prevent at least one of the other possible movements between the head 5 and the driving member 6: for example, their rotation relative to each other. The front connection 409 is preferably configured in such a way as to prevent all the other possible movements between the head 5 and the driving member 6 except for their translation relative to each other along the longitudinal axis 402.

The head 5 is thus coupled to the driving member 6 and is constrained to be translated without rotating relative thereto.

In a possible embodiment, the operating arm 4 comprises a rear spring 410.

The operating arm 4 is configured in such a way that the rear spring 410 operatively opposes the translation of the coupling member 7 relative to the supporting structure 401 along the longitudinal axis 402 when that translation is such as to displace the coupling member 7 relative to a reference position of the coupling member 7 itself. The reference position of the coupling member 7, too, should be considered along the longitudinal axis 402 and relative to the supporting structure 401.

Thus, the rear spring 410 is operatively interposed between the coupling member 7 and the supporting structure 401 to oppose their mutual displacement along the longitudinal axis 402 relative to the reference position of the coupling member 7.

In the embodiment shown in the accompanying drawings, the reference position of the coupling member 7 is the one shown in FIG. 2a and thus corresponds to the neutral position of the removal tool 403.

The reference position of the coupling member 7 corresponds to an operating reference condition of the rear spring 410. The operating reference condition of the rear spring 410 may, for example, be a condition in which the rear spring 410 is at rest or in static equilibrium.

Preferably, therefore, the rear spring 410 has a first end which is connected to the coupling member 7 and a second end which is connected to the supporting structure 401.

In a possible embodiment, the operating arm 4 comprises a front spring 411.

The operating arm 4 is configured in such a way that the front spring 411 operatively opposes, or counter, the angular displacement of the removal tool 403 relative to the head 5 about the axis of oscillation 405', when that angular displacement is such as to displace the removal tool 403 relative to an angular reference position of the removal tool 403 itself. The angular reference position of the removal tool 403 must be considered about the axis of oscillation 405' and relative to the head 5.

It should be borne in mind that the operating arm 4 is configured in such a way that the rotation of the removal tool 403 relative to the head 5 about the axis of oscillation 405' corresponds to the translation between the driving member 6 and the head 5 along the longitudinal axis 402. Thus, the angular reference position of the removal tool 403 corresponds to a longitudinal reference position of the driving member 6 relative to the head 5. The longitudinal reference position of the driving member 6 relative to the head 5 should be considered along the longitudinal axis 402.

Thus, the front spring 411 is operatively interposed between the head 5 and the driving member 6 or between the head 5 and the movable member 407b of the actuator 407 to oppose the mutual displacement of the driving member 6 and the head 5 relative to the longitudinal reference position of the driving member 6 and thus, to simultaneously oppose the angular displacement of the removal tool 403 relative to the angular reference position of the removal tool 403 itself.

In the embodiment shown in the accompanying drawings, the angular reference position of the removal tool 403 is the one shown in FIGS. 2a-2b and thus corresponds to the neutral position of the removal tool 403.

The angular reference position of the removal tool 403 corresponds to an operating reference condition of the front spring 411. The operating reference condition of the front spring 411 may, for example, be a condition in which the front spring 411 is at rest or in static equilibrium.

Preferably, therefore, the front spring 411 has a first end which is connected to the head 5 and a second end which is connected to the driving member 6.

As may be noted in FIGS. 2c and 5b, in the embodiment of the accompanying drawings, there are at least two coupling members 7, at least two middle couplings 701, at least two front couplings 702, two rear couplings 703, at least two rear springs 410 situated respectively on the two opposite sides of the longitudinal axis 402 or of the operating axis 402'.

In a possible embodiment, the operating arm 4 includes a first piston 412 acting on the movable member 407b of the actuator 407 to cause, by means of that movable member 407b, the movement of the driving member 6 along the longitudinal orientation or operating axis 402' at least in a first direction along the longitudinal axis 402.

In a possible embodiment, the operating arm 4 includes a second piston 413 acting on the movable member 407b of the actuator 407 to cause, by means of that movable member 407b, the movement of the driving member 6 along the longitudinal orientation or operating axis 402' in a first direction or in a second direction opposite to the first direction.

The first piston 412 and the second piston 413 apply their respective opposing forces preferably on the stationary member 407a of the actuator.

Figure 9:
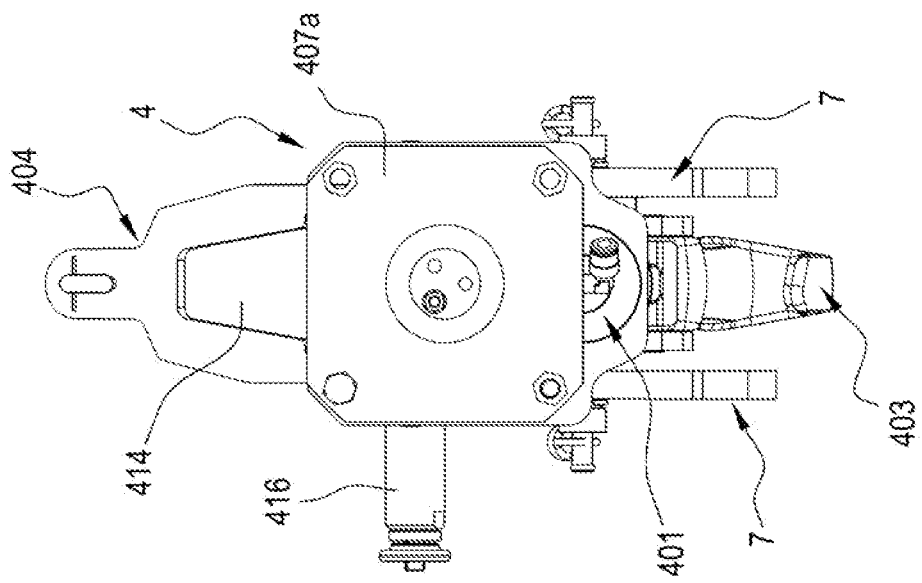
FIG. 9 shows the operating arm of FIG. 7 with a second tool tilted upside down and superposed on the first tool.
Figure 10A:
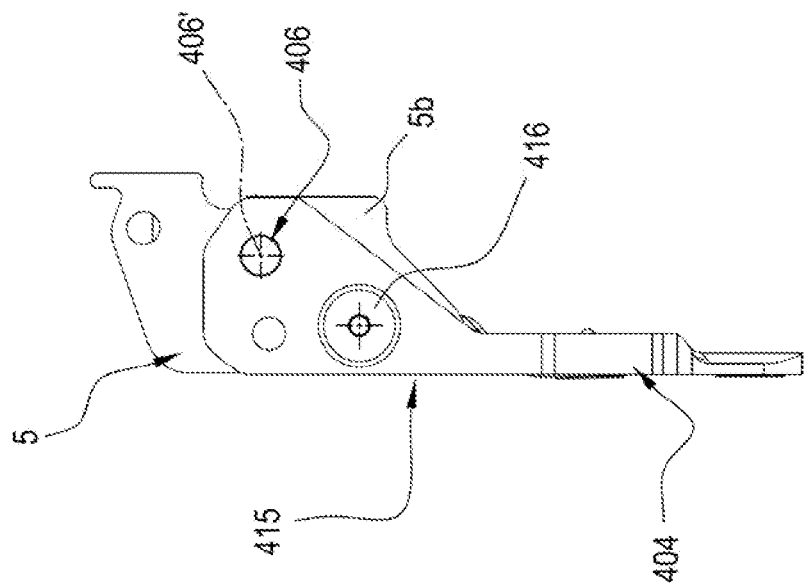
FIG. 10a illustrates a head of the operating arm of FIG. 2a, with the second tool opposed to the first tool.
Figure 10B:
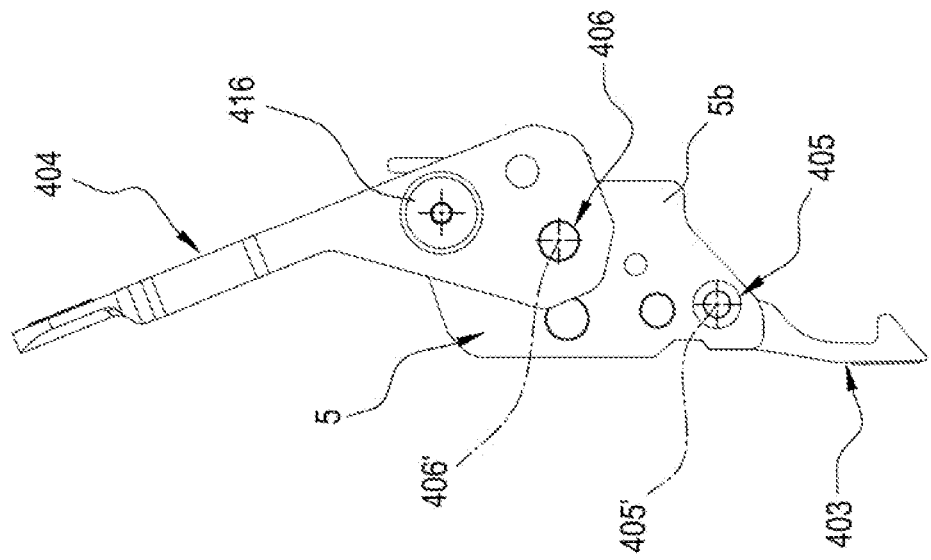
FIG. 10b illustrates the head of FIG. 10a, with the second tool tilted upside down and superposed on the first tool.

In a possible embodiment of the machine 1, the head 5 may adopt a first operating configuration, shown in all the accompanying drawings except FIGS. 9 and 10b, and a second operating configuration, shown in FIGS. 9 and 10b.

The first tool which, in a possible embodiment, may be the removal tool 403, projects from the head 5 in a first direction in both of the configurations.

In the first operating configuration, the second tool which, in a possible embodiment, may be the mounting tool 404, is disposed in a first position where it projects from the head 5 in a second direction, opposite to the first direction.

In the second operating configuration of the head 5, the second tool is disposed in a second position where it projects from the head 5 in the first direction. The second position of the second tool is tilted upside down relative to the first position of the second tool.

In a possible embodiment, the first tool and the second tool, when the latter is at its second position, jointly define a mounting tool.

The second tool by itself, therefore, might constitute the mounting tool, without acting in conjunction with the first tool.

The first direction is directed along a first orientation transverse to the longitudinal orientation and/or transverse to both the longitudinal axis 402 and/or the axis of tilt 406'.

The second direction is directed along a second orientation transverse to the longitudinal orientation and preferably to both the longitudinal axis 402 and to the axis of tilt 406'.

The first and second transverse orientations may coincide.

The second rotational connection 406 is configured in such a way that the second tool 404 can move from the first position to the second position and/or vice versa by rotation relative to the head 5 about the axis of tilt 406'.

In a preferred embodiment, the operating arm 4 is configured in such a way that when the head 5 is in its second operating configuration, and thus the second tool is at its second position, a first outside surface belonging to the first tool and a second outside surface belonging to the second tool lie on a single position surface 415 transverse to the longitudinal axis 402.

At the second position, the second tool is co-planar with the first tool in a plane transverse or at right angles to the longitudinal axis 402.

The second tool is provided with an opening 414 adapted to receive the first tool, in the second operating configuration of the head 5, or vice versa.

The opening 414 is adapted for the passage of at least part of the head 5 through the opening 414 when the second tool moves from the first position to the second position and vice versa.

As may be noted in FIG. 10b, the second tool, which may be the mounting tool 404, when it is at its second position, projects from the head 5 in the first direction more than the first tool, which may be the removal tool 403.

In a possible embodiment, the operating arm 4 includes a locking pin 416 coupled to the second tool. The locking pin 416 is movable between an extracted position where it does not interfere with the movement of the second tool between the first and second positions, and an inserted position where it does interfere with such movement in order to prevent the second tool from moving from the first position to the second position and/or vice versa.

In a possible embodiment, the operating arm 4 comprises a locking spring connected to the locking pin 416 to force it into the inserted position.

The operating arm 4 is configured in such a way that during the rotation of the second tool between the first and the second position, the locking pin remains in sliding contact with a surface of the head 5 until the second tool 404 reaches the first or the second position, where it automatically moves into the inserted position.

In an example embodiment, the first and second directions are aligned along the same axis so that, to move from the first to the second position or vice versa, the second tool performs a rotation of 180 degrees or approximately 180 degrees.

According to another aspect, this description relates to a method for removing a tyre from a respective rim of a vehicle wheel. The method is carried out by a removal tool 403 pivoted to a head 5, supported by a supporting structure 401 which supports the operating arm 4, and a driving member 6 articulated to the removal tool 403 at an operating point P.

The method comprises a step of displacing the driving member 6 relative to the supporting structure 401 along a longitudinal orientation by means of an actuator 407 connected or interposed between the driving member 6 and the supporting structure 401. This displacement step is carried out, for example, between the situation of FIGS. 2a-2b and the situation of FIG. 4 or of FIG. 5a.

The method comprises a step of rotating the removal tool 403 relative to the head 5 under the action of displacing the driving member 6. This rotation step is carried out, for example, between the situation of FIGS. 2a-2b and the situation of FIG. 4 or of FIG. 5a.

The method comprises a step of driving a coupling member 7 under the action of displacing the driving member 6. This driving step is carried out, for example, between the situation of FIGS. 2a-2b and the situation of FIG. 4 or of FIG. 5a.

The method comprises a step of displacing the head 5 relative to the supporting structure 401 along the longitudinal orientation and, consequently, also the removal tool 403 relative to the supporting structure 401 along the longitudinal orientation. This step of displacing the head 5 and also the removal tool 403 is carried out, for example, between the situation of FIGS. 4 and the situation of FIG. 5a.

To cause the step of rotating the removal tool 403 relative to the head 5, the step of displacing the driving member 6 relative to the supporting structure 401 along the longitudinal orientation has as its result, by way of the step of driving the coupling member 7, a displacement of the driving member 6 relative to the head 5 along the longitudinal orientation.

The displacement of the driving member 6 relative to the head 5 along the longitudinal orientation occurs, for example, between the situation of FIGS. 2a-2b and the situation of FIG. 4.

To cause the step of displacing the removal tool 403 relative to the supporting structure 401 along the longitudinal orientation, the step of displacing the driving member 6 relative to the supporting structure 401 along the longitudinal orientation has as its result, by way of the step of driving the coupling member 7, a displacement of the head 5 relative to the supporting structure 401 along the longitudinal orientation.

The rotation of the removal tool 403 relative to the head 5 occurs about an axis of oscillation 405' transverse or at right angles to the longitudinal orientation.

The rotation of the tool 403 relative to the head 5 is correlated with the difference between the displacement of the driving member 6 relative to the supporting structure 401 along the longitudinal orientation and the displacement of the head 5 relative to the supporting structure 401 also along the longitudinal orientation. This rotation is thus correlated with the displacement of the driving member 6 relative to the head 5 along the longitudinal orientation.

The translation, and thus the displacement, of the driving member 6 relative to the head 5 along the longitudinal orientation, is regulated by the driving of the coupling member 7.

The displacement of the driving member 6 relative to the supporting structure 401 includes a first stroke along the longitudinal orientation between a retracted position (for example the one shown in FIGS. 2a-2b) and an intermediate position (for example the one shown in FIG. 4).

The displacement of the driving member 6 relative to the supporting structure 401 includes a second stroke along the longitudinal orientation between the intermediate position (for example the one shown in FIG. 4) and an advanced position (for example the one shown in FIGS. 5a-5b).

During the first stroke, the head 5 is stationary relative to the supporting structure 401, at least along the longitudinal orientation, whilst the driving member 6, together with the operating point P of the removal tool 403, advance along the longitudinal orientation 402 both relative to the supporting structure 401 and relative to the head 5.

During the second stroke, the head 5, the driving member 6, and thus the operating point P of the removal tool 403, advance relative to the supporting structure 401 along the longitudinal orientation.

The displacement of the driving member 6 relative to the supporting structure 401 along the longitudinal orientation is as a whole greater than the displacement of the head 5 relative to the supporting structure 401 along the longitudinal orientation.

Also imaginable is the case where only the above mentioned second stroke of the driving member 6 relative to the supporting structure 401 along the longitudinal orientation is greater than the displacement of the head 5 relative to the supporting structure 401 along the longitudinal orientation.

In the latter case, the removal tool 403 rotates relative to the head 5 even for at least a part of the second stroke.

It may be stated that the advancing of the driving member 6 from the retracted position to the advanced position causes, for the head 5, a longitudinal translation by a first quantity and, for the operating point P of the removal tool 403, a longitudinal translation by a second quantity, greater than the first quantity.

It may be stated that during the first stroke, the head 5 is longitudinally stationary and the operating point P of the removal tool 403 advances longitudinally and during the second stroke, both the head 5 and the operating point P of the removal tool 403 advance longitudinally.

During the first and/or the second stroke of the driving member 6, the coupling member 7 rotates relative to the head 5 about an axis of rotation 701' which remains stationary relative to the head 5.

According to a further aspect, this description relates to a method for removing and fitting a tyre respectively from and to a respective rim of a vehicle wheel by means of a head 5, mounted on an operating arm 4 directed along a longitudinal orientation, a first tool 403 connected to the head 5 and, in a first position of it, projecting from the head 5 in a first direction, and a second tool 404 connected to the head 5 and, in a first position of it, projecting from the head 5 in a second direction.

The second direction is opposite to the first direction relative to the longitudinal orientation. The first and second directions are transverse and/or at right angles to the longitudinal orientation.

According to the method, the tyre is removed from the rim by causing the first tool to interact with the tyre during a step of rotating the rim about its axis.

The method comprises a step of rotating the second tool 404 about an axis of tilt 406' in order to tilt the second tool 404 between the first position and the second position. In the second position, the second tool 404 also projects in the first direction.

According to the method, the tyre might be fitted to the rim by causing a tool, defined by the first tool in its first position preferably in conjunction with the second tool in its second position, to interact with the tyre during a step of rotating the rim about its axis.

Fitting might also be carried by means of the second tool only, if the second tool by itself can define a mounting tool.

The method may also comprise moving a locking pin from an inserted position to an extracted position before rotating the second tool about the axis of tilt.

The invention claimed is:

1. A tyre changing machine, configured to remove a tyre from a respective rim of a vehicle wheel, comprising an operating arm which includes:
   a supporting structure;
   a head movable along a longitudinal axis relative to the supporting structure;
   a removal tool pivoted to the head to rotate relative thereto about an axis of oscillation transverse to the longitudinal axis;
   a driving member movable along an operating axis relative to the supporting structure and to the head;
   a crank having a first end, pivotally connected to the removal tool at an operating point spaced from the axis of oscillation, and a second end, pivotally connected to the driving member, whereby the driving member is articulated to the removed tool at the operating point through the crank;
   an actuator comprising a stationary member and a movable member, the movable member being adapted to drive the removal tool in rotation and in translation;
   a coupling member coupled to the supporting structure, to the head and to the driving member, wherein the movable member of the actuator is connected to the driving member to drive the driving member along the operating axis.

2. The tyre changing machine according to claim 1, wherein the coupling member is pivoted to the head.

3. The tyre changing machine according to claim 1, wherein the coupling member is movable by rotation and translation relative to the driving member.

4. The tyre changing machine according to claim 1, wherein the coupling member is movable relative to the supporting structure by rotation and translation along a sliding trajectory comprising a first sector and a second sector which are distinct from each other.

5. The tyre changing machine according to claim 4, wherein the coupling member is coupled to the supporting structure by a rear slot, which is integral with one between the coupling member and the supporting structure, and by a rear pin, which is integral with the other between the coupling member and the supporting structure, the rear pin being inserted in the rear slot and slidable therein to define a rear sliding coupling, wherein the rear slot comprises a first portion and a second portion, the first portion defining a circular arc and the second portion extending from the first portion away from a circle of the circular arc and changing direction relative thereto.

6. The tyre changing machine according to claim 5, wherein the rear slot is integral with the coupling member and the rear pin is integral with the supporting structure, the second portion extending from the first portion away from a centre of the circle.

7. The tyre changing machine according to claim 1, wherein the head is coupled to the supporting structure and is constrained to be translated without rotating relative thereto and wherein the head is coupled to the driving member and is constrained to be translated without rotating relative thereto.

8. The tyre changing machine according to claim 1, comprising a front spring having a first end which is connected to the head and a second end which is connected to the driving member.

9. The tyre changing machine according to claim 1, comprising a rear spring having a first end which is connected to the coupling member and a second end which is connected to the supporting structure.

10. The tyre changing machine according to claim 1, comprising:
  a first and a second tool;
  the first tool is connected to the head and projects in a first direction; and
  the second tool is connected to the head and, in a first operating configuration of the head, is disposed in a first position where the second tool projects from the head in a second direction, opposite to the first direction, and is pivoted to the head to rotate about an axis of tilt transverse to the longitudinal axis to move from the first position to a second position, corresponding to a second operating configuration of the head and tilted upside down relative to the first position, to project in the first direction;
  wherein the first tool is the removal tool and the second tool is a mounting tool, or vice versa.

11. The tyre changing machine of claim 1, wherein the driving member is slidably coupled to the supporting structure and is constrained to translate without rotating, with respect to the supporting structure.

12. The tyre changing machine according to claim 1, comprising an additional coupling member, wherein at least a portion of the head is interposed between the coupling member and the additional coupling member.

13. The tyre changing machine according to claim 12, wherein the head comprises a first part and a second part fixed to the first part, the removal tool pivoted to the second part of the head, and wherein the first part of the head is interposed between the coupling member and the additional coupling member.

14. The tyre changing machine according to claim 1, wherein the head comprises a first part, connected to the coupling member, and a second part fixed to the first part, wherein the second part of the head includes a first head plate and a second head plate, the removal tool being interposed between the first head plate and the second head plate of the second part of the head.

15. The tyre changing machine according to claim 1, comprising an additional coupling member, wherein at least a portion of the driving member is interposed between the coupling member and the additional coupling member.

16. The tyre changing machine according to claim 15, wherein the head includes a first head plate and a second head plate, the removal tool being interposed between the first head plate and the second head plate, and wherein said at least a portion of the driving member is interposed between the first head plate and the second head plate.

17. A method for removing a tyre from a respective rim of a vehicle wheel by means of an operating arm including a removal tool which is pivoted to a head movably supported by a supporting structure for supporting the operating arm, and which is articulated to a driving member through a crank at an operating point, the method comprising the following steps:
  advancing the driving member from a retracted position to an advanced position along a longitudinal orientation by means of an actuator connected between the driving member and the supporting structure;
  displacing the operating point of the removal tool as a result of advancing the driving member;
  by effect of advancing the driving member, driving a coupling member, which is kinematically coupled to the driving member and to the head;
  displacing the head along the longitudinal orientation as a result of the driving action applied to the head by coupling member,
  rotating the removal tool via the crank, responsive to a relative movement of the head with respect to the driving member.

18. The method according to claim 17, wherein the step of advancing the driving member from the retracted position to the advanced position causes, for the head, a longitudinal translation by a first quantity and, for the operating point of the removal tool, a longitudinal translation by a second quantity, greater than the first quantity.

19. The method according to claim 17, wherein the advancing of the driving member includes a first stroke, between the retracted position and an intermediate position, and a second stroke between the intermediate position and the advanced position, wherein during the first stroke, the head is longitudinally stationary and the operating point of the removal tool advances longitudinally and wherein during the second stroke, both the head and the operating point of the removal tool advance longitudinally.

20. The method according to claim 19, wherein during the second stroke of the driving member, the coupling member rotates relative to the head about an axis of rotation which remains stationary relative to the head.

* * * * *

UNITED STATES PATENT AND TRADEMARK OFFICE
CERTIFICATE OF CORRECTION

Page 1 of 1

PATENT NO. : 11,897,297 B2
APPLICATION NO. : 17/132933
DATED : February 13, 2024
INVENTOR(S) : Giulio Corghi It is certified that error appears in the above-identified patent and that said Letters Patent is hereby corrected as shown below:

On the Title Page

After Prior Publication Data
Insert item (30):
--Foreign Application Priority Data
Oct 18, 2016 (IT) 102016000104507
Oct 18, 2016 (IT) 102016000104639--

Signed and Sealed this
Twenty-fourth Day of December, 2024

Derrick Brent
*Acting Director of the United States Patent and Trademark Office*